US008776532B2

(12) United States Patent
Allam et al.

(10) Patent No.: US 8,776,532 B2
(45) Date of Patent: Jul. 15, 2014

(54) PARTIAL OXIDATION REACTION WITH CLOSED CYCLE QUENCH

(71) Applicants: Palmer Labs, LLC, Durham, NC (US); 8 Rivers Capital, LLC, Durham, NC (US)

(72) Inventors: Rodney John Allam, Chippenham (GB); Jeremy Eron Fetvedt, Raleigh, NC (US); Miles R. Palmer, Chapel Hill, NC (US)

(73) Assignees: Palmer Labs, LLC, Durham, NC (US); 8 Rivers Capital, LLC, Durham, NC (US)

( * ) Notice: Subject to any disclaimer, the term of this patent is extended or adjusted under 35 U.S.C. 154(b) by 0 days.

(21) Appl. No.: 13/763,922

(22) Filed: Feb. 11, 2013

(65) Prior Publication Data
US 2013/0205746 A1 Aug. 15, 2013

Related U.S. Application Data

(60) Provisional application No. 61/597,719, filed on Feb. 11, 2012.

(51) Int. Cl.
*F02C 3/20* (2006.01)
(52) U.S. Cl.
USPC .......... 60/780; 60/781; 60/783; 60/39.5; 60/39.52; 60/39.464
(58) Field of Classification Search
USPC ............ 60/780, 781, 39.464, 39.5, 39.511, 60/39.52, 39.12, 783, 39.522
See application file for complete search history.

(56) References Cited

U.S. PATENT DOCUMENTS 3,369,361 A * 2/1968 Craig ..................... 60/39.5
(Continued)

FOREIGN PATENT DOCUMENTS

| DE | 10 2009 015 767 | 10/2007 |
| JP | 2225905 | 9/1990 |

(Continued)

OTHER PUBLICATIONS

Combs, Jr. "An Investigation of the Supercritical CO2 Cycle (Feher Cycle) for Shipboard Application," 1977, *Submitted in Partial Fulfillment of the Requirements for the Degree of Ocean Engineer and the Degree of Master of Science in Mecganical Engineering at the Massachusetts Institute of Technology*, 148.

(Continued)

*Primary Examiner* — Phutthiwat Wongwian
*Assistant Examiner* — Steven Sutherland
(74) *Attorney, Agent, or Firm* — Womble Carlyle Sandridge & Rice, LLP

(57) ABSTRACT

The present disclosure relates to a power production system that is adapted to achieve high efficiency power production with complete carbon capture when using a solid or liquid hydrocarbon or carbonaceous fuel. More particularly, the solid or liquid fuel first is partially oxidized in a partial oxidation reactor. The resulting partially oxidized stream that comprises a fuel gas is quenched, filtered, cooled, and then directed to a combustor of a power production system as the combustion fuel. The partially oxidized stream is combined with a compressed recycle $CO_2$ stream and oxygen. The combustion stream is expanded across a turbine to produce power and passed through a recuperator heat exchanger. The expanded and cooled exhaust stream is scrubbed to provide the recycle $CO_2$ stream, which is compressed and passed through the recuperator heat exchanger and the POX heat exchanger in a manner useful to provide increased efficiency to the combined systems.

53 Claims, 6 Drawing Sheets

(56) References Cited

U.S. PATENT DOCUMENTS

| | | | |
|---|---|---|---|
| 3,376,706 A | 4/1968 | Angelino | |
| 3,503,208 A | 3/1970 | Schmidt | |
| 3,544,291 A * | 12/1970 | Schlinger et al. | 48/206 |
| 3,736,745 A | 6/1973 | Karig | |
| 3,837,788 A | 9/1974 | Craig et al. | |
| 3,868,817 A * | 3/1975 | Marion et al. | 60/781 |
| 3,971,211 A | 7/1976 | Wethe et al. | |
| 3,976,443 A | 8/1976 | Paull et al. | |
| 4,132,065 A * | 1/1979 | McGann | 60/780 |
| 4,154,581 A | 5/1979 | Nack et al. | |
| 4,191,500 A | 3/1980 | Oberg et al. | |
| 4,193,259 A | 3/1980 | Muenger et al. | |
| 4,206,610 A | 6/1980 | Santhanam | |
| 4,461,154 A | 7/1984 | Allam | |
| 4,498,289 A | 2/1985 | Osgerby | |
| 4,522,628 A | 6/1985 | Savins | |
| 4,602,483 A | 7/1986 | Wilks et al. | |
| 4,702,747 A | 10/1987 | Meyer et al. | |
| 4,721,420 A | 1/1988 | Santhanam et al. | |
| 4,765,143 A | 8/1988 | Crawford et al. | |
| 4,765,781 A | 8/1988 | Wilks et al. | |
| 4,839,030 A | 6/1989 | Comolli et al. | |
| 4,852,996 A | 8/1989 | Knop et al. | |
| 4,881,366 A | 11/1989 | Nurse | |
| 4,999,992 A | 3/1991 | Nurse | |
| 4,999,995 A | 3/1991 | Nurse | |
| 5,175,995 A | 1/1993 | Pak et al. | |
| 5,247,791 A | 9/1993 | Pak et al. | |
| 5,265,410 A * | 11/1993 | Hisatome | 60/39.12 |
| 5,319,924 A | 6/1994 | Wallace et al. | |
| 5,345,756 A * | 9/1994 | Jahnke et al. | 60/781 |
| 5,353,721 A | 10/1994 | Mansour et al. | |
| 5,394,686 A * | 3/1995 | Child et al. | 60/780 |
| 5,415,673 A * | 5/1995 | Hilton et al. | 48/197 R |
| 5,421,166 A * | 6/1995 | Allam et al. | 62/649 |
| 5,507,141 A * | 4/1996 | Stigsson | 60/775 |
| 5,520,894 A | 5/1996 | Heesink et al. | |
| 5,590,519 A | 1/1997 | Almlöf et al. | |
| 5,595,059 A | 1/1997 | Huber et al. | |
| 5,692,890 A | 12/1997 | Graville | |
| 5,709,077 A | 1/1998 | Beichel | |
| 5,715,673 A | 2/1998 | Beichel | |
| 5,724,805 A | 3/1998 | Golomb et al. | |
| 5,802,840 A | 9/1998 | Wolf | |
| 5,906,806 A | 5/1999 | Clark | |
| 5,937,652 A | 8/1999 | Abdelmalek | |
| 6,024,029 A | 2/2000 | Clark | |
| 6,117,916 A | 9/2000 | Allam et al. | |
| 6,148,602 A | 11/2000 | Demetri | |
| 6,170,264 B1 | 1/2001 | Viteri et al. | |
| 6,196,000 B1 | 3/2001 | Fassbender | |
| 6,199,364 B1 | 3/2001 | Kendall et al. | |
| 6,202,574 B1 | 3/2001 | Liljedahl et al. | |
| 6,209,307 B1 | 4/2001 | Hartman | |
| 6,260,348 B1 | 7/2001 | Sugishita et al. | |
| 6,263,661 B1 | 7/2001 | Van der Burgt et al. | |
| 6,269,624 B1 | 8/2001 | Frutschi et al. | |
| 6,298,664 B1 | 10/2001 | Åsen et al. | |
| 6,333,015 B1 | 12/2001 | Lewis | |
| 6,360,561 B2 | 3/2002 | Allam et al. | |
| 6,389,814 B2 | 5/2002 | Viteri et al. | |
| 6,430,916 B2 | 8/2002 | Sugishita et al. | |
| 6,532,745 B1 | 3/2003 | Neary | |
| 6,536,205 B2 | 3/2003 | Sugishita et al. | |
| 6,543,214 B2 | 4/2003 | Sasaki et al. | |
| 6,550,234 B2 | 4/2003 | Guillard | |
| 6,598,398 B2 | 7/2003 | Viteri et al. | |
| 6,612,113 B2 | 9/2003 | Guillard | |
| 6,622,470 B2 | 9/2003 | Viteri et al. | |
| 6,629,414 B2 | 10/2003 | Fischer | |
| 6,637,183 B2 | 10/2003 | Viteri et al. | |
| 6,684,643 B2 * | 2/2004 | Frutschi | 60/772 |
| 6,764,530 B2 | 7/2004 | Iijima | |
| 6,775,987 B2 | 8/2004 | Sprouse et al. | |
| 6,802,178 B2 | 10/2004 | Sprouse et al. | |
| 6,820,689 B2 | 11/2004 | Sarada | |
| 6,824,710 B2 | 11/2004 | Viteri et al. | |
| 6,871,502 B2 | 3/2005 | Marin et al. | |
| 6,877,319 B2 | 4/2005 | Linder et al. | |
| 6,877,322 B2 | 4/2005 | Fan | |
| 6,898,936 B1 | 5/2005 | Ochs et al. | |
| 6,910,335 B2 | 6/2005 | Viteri et al. | |
| 6,918,253 B2 | 7/2005 | Fassbender | |
| 6,945,029 B2 | 9/2005 | Viteri | |
| 6,993,912 B2 | 2/2006 | Fischer | |
| 7,007,474 B1 | 3/2006 | Ochs et al. | |
| 7,007,486 B2 | 3/2006 | Sprouse et al. | |
| 7,021,063 B2 | 4/2006 | Viteri | |
| 7,022,168 B2 | 4/2006 | Schimkat et al. | |
| 7,043,920 B2 | 5/2006 | Viteri et al. | |
| 7,074,033 B2 | 7/2006 | Neary | |
| 7,111,463 B2 | 9/2006 | Sprouse et al. | |
| 7,124,589 B2 | 10/2006 | Neary | |
| 7,147,461 B2 | 12/2006 | Neary | |
| 7,191,587 B2 | 3/2007 | Marin et al. | |
| 7,192,569 B2 | 3/2007 | Stewart | |
| 7,284,362 B2 | 10/2007 | Marin et al. | |
| 7,299,637 B2 | 11/2007 | Becker | |
| 7,303,597 B2 | 12/2007 | Sprouse et al. | |
| 7,328,581 B2 | 2/2008 | Christensen et al. | |
| 7,334,631 B2 | 2/2008 | Kato et al. | |
| 7,360,639 B2 | 4/2008 | Sprouse et al. | |
| 7,377,111 B2 | 5/2008 | Agnew | |
| 7,387,197 B2 | 6/2008 | Sprouse et al. | |
| 7,402,188 B2 | 7/2008 | Sprouse | |
| 7,469,544 B2 | 12/2008 | Farhangi | |
| 7,469,781 B2 | 12/2008 | Chataing et al. | |
| 7,516,607 B2 | 4/2009 | Farhangi et al. | |
| 7,516,609 B2 | 4/2009 | Agnew | |
| 7,547,419 B2 | 6/2009 | Sprouse et al. | |
| 7,547,423 B2 | 6/2009 | Sprouse et al. | |
| 7,553,463 B2 | 6/2009 | Zauderer | |
| 7,615,198 B2 | 11/2009 | Sprouse et al. | |
| 7,665,291 B2 * | 2/2010 | Anand et al. | 60/39.12 |
| 7,717,046 B2 | 5/2010 | Sprouse et al. | |
| 7,722,690 B2 | 5/2010 | Shires et al. | |
| 7,731,783 B2 | 6/2010 | Sprouse et al. | |
| 7,740,671 B2 | 6/2010 | Yows et al. | |
| 7,740,672 B2 | 6/2010 | Sprouse | |
| 7,814,975 B2 | 10/2010 | Hagen et al. | |
| 7,826,054 B2 | 11/2010 | Zillmer et al. | |
| 7,927,574 B2 | 4/2011 | Stewart | |
| 7,934,383 B2 * | 5/2011 | Gutierrez et al. | 60/780 |
| 2002/0121092 A1 | 9/2002 | Allam et al. | |
| 2003/0131582 A1 | 7/2003 | Anderson et al. | |
| 2004/0011057 A1 | 1/2004 | Huber | |
| 2004/0123601 A1 | 7/2004 | Fan | |
| 2005/0126156 A1 | 6/2005 | Anderson et al. | |
| 2006/0242907 A1 | 11/2006 | Sprouse et al. | |
| 2007/0122328 A1 | 5/2007 | Allam et al. | |
| 2007/0180768 A1 | 8/2007 | Briesch et al. | |
| 2007/0274876 A1 | 11/2007 | Chiu et al. | |
| 2008/0010967 A1 | 1/2008 | Griffin et al. | |
| 2008/0104958 A1 | 5/2008 | Finkenrath et al. | |
| 2008/0115500 A1 | 5/2008 | MacAdam et al. | |
| 2008/0166672 A1 | 7/2008 | Schlote et al. | |
| 2008/0173584 A1 | 7/2008 | White et al. | |
| 2008/0173585 A1 | 7/2008 | White et al. | |
| 2008/0176174 A1 | 7/2008 | White et al. | |
| 2008/0187877 A1 | 8/2008 | Fitzsimmons et al. | |
| 2008/0190214 A1 | 8/2008 | Ubowski et al. | |
| 2008/0222956 A1 | 9/2008 | Tsangaris et al. | |
| 2008/0226515 A1 | 9/2008 | Allam et al. | |
| 2008/0309087 A1 | 12/2008 | Evulet et al. | |
| 2009/0061264 A1 | 3/2009 | Agnew | |
| 2009/0229271 A1 | 9/2009 | De Ruyck et al. | |
| 2009/0301054 A1 | 12/2009 | Simpson et al. | |
| 2010/0018218 A1 | 1/2010 | Riley et al. | |
| 2010/0024378 A1 | 2/2010 | Ackermann et al. | |
| 2010/0024381 A1 | 2/2010 | Ackermann et al. | |
| 2010/0024433 A1 | 2/2010 | Ackermann et al. | |
| 2010/0031668 A1 | 2/2010 | Kepplinger | |
| 2010/0077752 A1 | 4/2010 | Papile | |
| 2010/0263385 A1 | 10/2010 | Allam | |

(56) References Cited

U.S. PATENT DOCUMENTS

| | | | |
|---|---|---|---|
| 2010/0324156 | A1 | 12/2010 | Winter et al. |
| 2011/0023539 | A1 | 2/2011 | White et al. |
| 2011/0036011 | A1 | 2/2011 | Sprouse et al. |
| 2011/0127773 | A1 | 6/2011 | Freund et al. |
| 2011/0233940 | A1 | 9/2011 | Aoyama et al. |
| 2011/0239651 | A1 | 10/2011 | Aoyama et al. |
| 2011/0271713 | A1 | 11/2011 | White et al. |
| 2012/0131925 | A1 | 5/2012 | Mittricker et al. |
| 2012/0247105 | A1 | 10/2012 | Nelson et al. |

FOREIGN PATENT DOCUMENTS

| | | |
|---|---|---|
| WO | WO 95/12757 | 5/1995 |
| WO | WO 03/080503 | 10/2003 |

OTHER PUBLICATIONS

Dostal et al., "A Supercritical Carbon Dioxide Cycle for Next Generation Nuclear Reactors," 2004, (*Research Paper*) *Advanced Nuclear Power Technology Program at MIT*, 326 pages.

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission CO2-Based Power Plant" *Energy Conyers. Mgmt*, 1997, Suppl. pp. S141-S146, vol. 38.

E.I. Yantovskii et al., "Computer Exergonomics of Power Plants Without Exhaust Gases," Energy Conyers. Mgmt., Publ. 1992, vol. 33, No. 5-8, pp. 405-412.

Wall et al., "A Zero Emission Combustion Power Plant for Enhanced Oil Recovery," *Energy*, 1995, pp. 823-828, vol. 20, No. 8.

http://www.graz-cycle.tugraz.at/pdfs/Bolland_Kvamsdal_Boden_Liege.pdf; Boland, "A Thermodynamic Comparison of the Oxy-Fuel Power Cycles Water-Cycle, Graz-Cycle and Matiant-Cycle," *Norwegian University of Science and Technology*, Trondheim, Norway. Presentation, paper published in the proceedings of the International Conference Power Generation and Sustainable Development, Liège (Belgium), Oct. 8-9, 2001.

http://mm2.ulg.ac.be/genienuc/pageco2.htm; Université de Liège, Department of Power Generation, "CO2 Researches" Web-page dated Sep. 1, 1998 (retrieved on Feb. 25, 2011).

Mathieu et al., "Sensitivity Analysis of the MATIANT Cycle", *Energy Conversion & Management*, 1999, pp. 1687-1700, vol. 40.

\* cited by examiner

| COAL GASIFICATION MODEL WITH WATER QUENCHING | | | | | | | | | | | | | |
|---|---|---|---|---|---|---|---|---|---|---|---|---|---|
| LIQUID-VAPOUR COMPONENTS | | | | | | | | | | | SOLID COMPONENTS | | |
| Mole Frac | Net H2O Product | Net CO2 Product | Coal Slurry | N2 for Coal Drying | O2 for POX | O2 for PPS | Recycle CO2 In | Recycle CO2 Out | Quenched Fuel Gas | | Mass Flow lb/hr | Coal Slurry | Coal Feed |
| CO2 | 0.01322 | 0.97507 | 0.9078826 | 0 | 0 | 0.00000 | 0.97507 | 0.97507 | 0.13186 | | COAL | 90.72 | 100.00 |
| CO | 6.46E-11 | 8.45E-07 | 7.87E-07 | 0 | 0 | 0 | 8.45E-07 | 8.45E-07 | 0.31097 | | ASH | 0.00 | 0.00 |
| CH4 | 5.26E-15 | 7.63E-12 | 7.11E-12 | 0 | 0 | 0 | 7.63E-12 | 7.63E-12 | 0.00001 | | | | |
| H2O | 0.88102 | 0.00094 | 0.06978 | 0 | 0 | 0 | 0.00094 | 0.00094 | 0.49049 | | Proximate Analysis | | |
| O2 | 8.96E-06 | 0.00941 | 0.00087575 | 0.00100 | 0.99500 | 0.99500 | 0.00941 | 0.00941 | 3.24E-12 | | MOISTURE | 3.00 | 12.00 |
| H2 | 9.24E-13 | 1.59E-08 | 1.48E-08 | 0 | 0 | 0 | 1.59E-08 | 1.59E-08 | 0.05353 | | FIXED CARBON | 39.00 | 39.00 |
| N2 | 6.88E-07 | 0.00806 | 0.0075091 | 0.99900 | 0 | 0 | 0.00806 | 0.00806 | 0.00369 | | VOLATILE MATTER | 33.00 | 33.00 |
| AR | 4.94E-06 | 0.00599 | 0.0055787 | 0 | 0.00500 | 0.005 | 0.00599 | 0.00599 | 0.00170 | | ASH | 16.00 | 16.00 |
| C | 0 | 0 | 0 | 0 | 0 | 0 | 0 | 0 | 0 | | | | |
| CL2 | 3.31E-07 | 1.36E-06 | 1.27E-06 | 0 | 0 | 0 | 1.36E-06 | 1.36E-06 | 3.55E-13 | | Mass Frac | | |
| HCL | 3.46E-05 | 5.14E-04 | 0.0004787 | 0 | 0 | 0 | 5.14E-04 | 5.14E-04 | 0.00026 | | Ultimate Analysis | | |
| S | 1.46E-11 | 9.30E-22 | 8.66E-22 | 0 | 0 | 0 | 9.30E-22 | 9.30E-22 | 1.11E-07 | | ASH | 18.18 | 18.18 |
| SO2 | 0 | 0 | 0 | 0 | 0 | 0 | 0 | 0 | 8.20E-06 | | CARBON | 62.90 | 62.90 |
| SO3 | 0.00E+00 | 0.00E+00 | 0 | 0 | 0 | 0 | 0.00E+00 | 0.00E+00 | 4.77E-12 | | HYDROGEN | 4.55 | 4.55 |
| H2S | 1.54E-06 | 7.48E-06 | 6.96E-06 | 0 | 0 | 0 | 7.48E-06 | 7.48E-06 | 0.00749 | | NITROGEN | 1.23 | 1.23 |
| NO2 | 0.00E+00 | 0.00000 | 0 | 0 | 0 | 0 | 0.00000 | 0.00000 | 1.06E-16 | | CHLORINE | 0.11 | 0.11 |
| NO | 0 | 0 | 0 | 0 | 0 | 0 | 0 | 0 | 7.65E-10 | | SULFUR | 4.55 | 4.55 |
| H2SO4 | 1.37E-05 | 7.38E-13 | 6.87E-13 | 0 | 0 | 0 | 7.38E-13 | 7.38E-13 | 1.47E-13 | | OXYGEN | 8.49 | 8.49 |
| HNO3 | 2.52E-04 | 2.42E-06 | 2.25E-06 | 0 | 0 | 0 | 2.42E-06 | 2.42E-06 | 4.17E-24 | | | | |
| H3O+ | 5.27E-02 | 0.00000 | 0 | 0 | 0 | 0 | 0.00000 | 0.00000 | 0 | | | | |
| NO3- | 9.42E-07 | 0.00000 | 0 | 0 | 0 | 0 | 0.00000 | 0.00000 | 0 | | | | |
| CL- | 1.30E-04 | 0.00000 | 0 | 0 | 0 | 0 | 0.00000 | 0.00000 | 0 | | | | |
| HSO4- | 5.23E-02 | 0.00000 | 0 | 0 | 0 | 0 | 0.00000 | 0.00000 | 0 | | | | |
| SO4-- | 3.06E-07 | 0.00000 | 0 | 0 | 0 | 0 | 0.00000 | 0.00000 | 0 | | | | |
| NO2- | 0.00031566 | | | | | | | | | | | | |
| Total Flow lbmol/hr | 2.39 | 4.69 | 3.24 | 178.50 | 2.18 | 3.45 | 19.59 | 19.59 | 17.06 | | Total Flow lb/hr | 90.72 | 100.00 |
| Temperature F | 63.00 | 128.27 | 100.00 | 100.00 | 60.00 | 65.00 | 128.27 | 463.31 | 760.21 | | Temperature F | 100.00 | 77.00 |
| Pressure bar | 29.25 | 305.00 | 1.00 | 1.00 | 85.00 | 30.00 | 305.00 | 305.00 | 82.00 | | Pressure bar | 1.00 | 1.01 |

FIG. 5

COAL GASIFICATION MODEL WITH CARBON DIOXIDE QUENCHING

LIQUID-VAPOUR COMPONENTS

| Mole Frac | Net H2O Product | Net CO2 Product | Coal Slurry | N2 for Coal Drying | O2 for POX | O2 for PPS | Recycle CO2 In | Recycle CO2 Out | Quenched Fuel Gas |
|---|---|---|---|---|---|---|---|---|---|
| CO2 | 0.01322 | 0.97560 | 0.90836 | 0 | 0 | 0 | 0.97560 | 0.97560 | 0.25504 |
| CO | 6.60E-11 | 8.63E-07 | 8.04E-07 | 0 | 0 | 0 | 8.63E-07 | 8.63E-07 | 0.58625 |
| CH4 | 5.46E-15 | 7.92E-12 | 7.38E-12 | 0 | 0 | 0 | 7.92E-12 | 7.92E-12 | 0.00002 |
| H2O | 0.88104 | 0.00094 | 0.06979 | 0 | 0 | 0 | 0.00094 | 0.00094 | 0.03240 |
| O2 | 8.45E-06 | 0.00887 | 0.00826 | 0.00100 | 0.99500 | 0.99500 | 0.00887 | 0.00887 | 0.00013 |
| H2 | 9.22E-13 | 1.59E-08 | 1.48E-08 | 0 | 0 | 0 | 1.59E-08 | 1.59E-08 | 0.10182 |
| N2 | 6.88E-07 | 0.00807 | 0.00752 | 0.99900 | 0 | 0 | 0.00807 | 0.00807 | 0.00701 |
| AR | 4.93E-06 | 0.00599 | 0.00558 | 0 | 0.00500 | 0.00500 | 0.00599 | 0.00599 | 0.00324 |
| C | 0 | 0 | 0 | 0 | 0 | 0 | 0 | 0 | 0 |
| CL2 | 3.19E-07 | 1.31E-06 | 1.22E-06 | 0 | 0 | 0 | 1.31E-06 | 1.31E-06 | 1.90E-08 |
| HCL | 3.46E-05 | 0.00051 | 0.00048 | 0 | 0 | 0 | 0.00051 | 0.00051 | 0.00049 |
| S | 1.33E-11 | 9.13E-22 | 8.50E-22 | 0 | 0 | 0 | 9.13E-22 | 9.13E-22 | 2.03E-07 |
| SO2 | 0 | 0 | 0 | 0 | 0 | 0 | 0 | 0 | 1.34E-05 |
| SO3 | 0 | 0 | 0 | 0 | 0 | 0 | 0 | 0 | 4.12E-12 |
| H2S | 1.48E-06 | 7.21E-06 | 6.71E-06 | 0 | 0 | 0 | 7.21E-06 | 7.21E-06 | 0.01360 |
| NO2 | 0 | 0 | 0 | 0 | 0 | 0 | 0 | 0 | 4.16E-17 |
| NO | 0 | 0 | 0 | 0 | 0 | 0 | 0 | 0 | 1.38E-09 |
| H2SO4 | 1.37E-05 | 7.39E-13 | 6.88E-13 | 0 | 0 | 0 | 7.39E-13 | 7.39E-13 | 1.10E-14 |
| HNO3 | 0.00025 | 2.36E-06 | 2.19E-06 | 0 | 0 | 0 | 2.36E-06 | 2.36E-06 | 2.26E-08 |
| H3O+ | 0.05272 | 0 | 0 | 0 | 0 | 0 | 0 | 0 | 2.82E-26 |
| NO3- | 9.17E-07 | 0 | 0 | 0 | 0 | 0 | 0 | 0 | 6.41E-36 |
| CL- | 0.00013 | 0 | 0 | 0 | 0 | 0 | 0 | 0 | 2.71E-33 |
| HSO4 | 0.05226 | 0 | 0 | 0 | 0 | 0 | 0 | 0 | 2.69E-26 |
| SO4-- | 3.06E-07 | 0 | 0 | 0 | 0 | 0 | 0 | 0 | 1.88E-60 |
| NO2- | 0.00032 | 0 | 0 | 0 | 0 | 0 | 0 | 0 | 6.42E-36 |
| Total Flow lbmol/hr | 2.39 | 4.69 | 3.24 | 178.50 | 2.15 | 3.48 | 26.20 | 26.20 | 40.64 |
| Temperature F | 63.00 | 128.10 | 100.00 | 100.00 | 60.00 | 60.00 | 128.08 | 629.40 | 751.11 |
| Pressure bar | 29.25 | 305.00 | 1.00 | 1.00 | 85.00 | 30.00 | 304.75 | 304.75 | 80.75 |

SOLID COMPONENTS

| Mass Flow lb/hr | Coal Slurry | Coal Feed |
|---|---|---|
| COAL | 90.72 | 100.00 |
| ASH | 0.00 | 0.00 |
| Proximate Analysis | | |
| MOISTURE | 3.00 | 12.00 |
| FIXED CARBON | 39.00 | 39.00 |
| VOLATILE MATTER | 33.00 | 33.00 |
| ASH | 16.00 | 16.00 |
| Mass Frac Ultimate Analysis | | |
| ASH | 18.18 | 18.18 |
| CARBON | 62.90 | 62.90 |
| HYDROGEN | 4.55 | 4.55 |
| NITROGEN | 1.23 | 1.23 |
| CHLORINE | 0.11 | 0.11 |
| SULFUR | 4.55 | 4.55 |
| OXYGEN | 8.49 | 8.49 |
| Total Flow lb/hr | 90.72 | 100.00 |
| Temperature F | 100.00 | 77.00 |
| Pressure bar | 1.00 | 1.01 |

FIG. 6

PARTIAL OXIDATION REACTION WITH CLOSED CYCLE QUENCH

CROSS-REFERENCE TO RELATED APPLICATIONS

The present application claims priority to U.S. Provisional Patent Application No. 61/597,719, filed Feb. 11, 2012, the disclosure of which is incorporated herein by reference in its entirety.

FIELD OF THE DISCLOSURE

The present invention is directed to systems and methods for generation of power, such as electricity, that utilize a partial oxidation reactor to achieve high efficiency combustion of a solid fuel. Particularly, the system and method can use coal as the solid fuel.

BACKGROUND

Conventional means of power production from combustion of a fuel typically lack the ability to achieve both high efficiency power generation and carbon capture and sequestration (CCS) simultaneously. This limitation is magnified when using solid fuels in the combustion reaction because of the solid and inert nitrogen gas contents remaining in the combustion product stream. Accordingly, there is an ever growing need in the art for systems and methods for high efficiency power generation allowing for a reduction in $CO_2$ emission and/or improved ease of sequestration of produced One publication in the field of high efficiency power generation with CCS, U.S. Patent Application Publication No. 2011/0179799 to Allam et al. provides one solution whereby a solid fuel such as coal, lignite, pet-coke or biomass is gasified by reaction with oxygen and optionally steam in a partial oxidation reactor operating at a sufficiently high pressure and temperature to allow substantially complete conversion of the solid fuel to a gaseous fuel comprising mainly carbon monoxide and hydrogen as the combustible components together with combustion derived impurities, such as $H_2S$, $CS_2$, COS, HCN, and $NH_3$. The partially oxidized net product gas is cooled, ash is separated, and it is optionally compressed to allow it to be introduced as fuel into the combustion chamber of the power generation system. The operating pressure of the partial oxidation system and the power generation system can be such that no compression of the fuel gas is required. The power generation system combustor operates with an excess of $O_2$ present following combustion, which ensures that the fuel and combustion derived impurities are converted from the reduced to their oxidized forms comprising predominantly $SO_2$ and NO. The partial oxidation reactor can be provided with transpirationally cooled walls with a high pressure recycle $CO_2$ stream cooling the partial oxidation product gas before ash removal at a temperature level of about 800° C. Further cooling of the partial oxidation gas to about 400° C. is necessary to ensure that all fine ash particles together with solidified volatile inorganic components are condensed and filtered to prevent solid deposition, corrosion, and blockage of down-stream equipment. The cooling of the partial oxidation gas from 800° C. to 400° C. must take place in a heat exchanger with tubes for the high pressure partial oxidation gas that are resistant to metal dusting corrosion due to the Boudouard carbon forming reaction and the high CO partial pressure in the partial oxidation gas. This is shown below in Formula (1).

  (1)

The tubes must be designed to allow periodic water washing to remove solid deposits derived from the condensation of volatile inorganic components present in solid fuels, particularly coal and lignite.

Despite the advances of the above-described publication, the systems and methods described therein still do not provide a most advantageous solution to the problems arising when using solid fuels as a power production combustion fuel. Thus, there remains a need for further systems and methods for high efficiency combustion of solid fuels with CCS.

BRIEF SUMMARY OF THE DISCLOSURE

The present disclosure provides systems and methods for high efficiency power production utilizing solid fuels and achieving simultaneous carbon capture. In particular, the disclosed systems and methods can utilize a partial oxidation (POX) reactor wherein the solid fuel is combusted to produce a POX stream comprising partial oxidation products. The POX stream can be directed to a combustor wherein the at least some of the partial oxidation products are substantially completely oxidized to produce a combustion product stream. In certain embodiments, the POX reactor can be operated at pressure that is lower than the pressure in the combustor.

In specific embodiments, the POX reactor can be can be adapted to utilize a quench cooling fluid. For example, the quench cooling fluid can be introduced to cool the POX stream from the POX reaction temperature to a quenched POX stream temperature. In exemplary embodiments, the ratio of the POX reaction temperature to the quenched POX stream temperature can be about 3.25 or greater (e.g., about 3.5:1 or about 4:1). As non-limiting examples, the POX reaction temperature can about 1300° C. or greater (e.g., about 1300° C. to about 1600° C.), and the quenched POX stream temperature can be at a temperature of about 200° C. to about 400° C. The quench cooling can be carried out by direct mixing with the POX stream in the POX reactor or a separate vessel.

In other embodiments, solids (such as solid ash particles) produced during partial oxidation of the primary POX fuel can be removed by separation from the gaseous fuel gas plus vaporized quench fluid. Alternatively the quench fluid can be present as an additional liquid phase as well as in the gas phase and act as a scrubbing fluid to remove the bulk of the ash particles. A quench temperature of about 400° C. or less can be useful to prevent metal dusting by slowing down the Boudouard reaction where solid carbon is formed from reaction of CO molecules. It further can be preferable to operate the quench system so that a single phase gaseous POX product with entrained ash particles can be passed through a cyclone and filter system to remove ash particles.

In further embodiments, the mixture of the POX stream and the quench cooling fluid vapor can be additionally cooled, such as to a temperature of about 100° C. or less to provide a cooled POX stream. Quenching and/or cooling of the POX stream preferably is carried out in a manner such that a majority of the useful heat present in the quenched POX stream gas at the POX reaction temperature is recovered. The recovered heat can be, for example, transferred to the power production system to provide low temperature heating that can maximize the efficiency of the power production system, which is further described herein. In some embodiments, part or all of the quench fluid can be separated from the cooled POX stream. The recovered quench fluid can be recycled to the POX reactor.

The disclosed systems and methods are beneficial in that existing, commercially available POX reactors can be adapted for efficient integration with a power production system. Moreover, the disclosed systems and methods can be adapted for separation of gaseous products. For example, substantially pure $H_2$, CO, or mixtures thereof can be separated from the cooled POX stream. The disclosed systems and methods further are beneficial in that part or all of the fuel and POX-derived impurities present in the POX stream can be oxidized in the combustor of the power production system. Thereafter, such impurities can be removed (e.g., as acids and salts), such as with a condensed water stream.

In some embodiments, the present disclosure relates to a process comprising the partial oxidation of a carbonaceous or hydrocarbon fuel by combination with oxygen in a POX reactor. The fuel can include at least sulfur compounds. The POX reaction can yield a fuel gas mixture comprising at least $H_2$, CO, and $H_2S$. In further embodiments, the POX reaction can yield a fuel gas mixture comprising at least $H_2$, CO, $H_2S$, $NH_3$, and HCN. The POX system can be coupled to a Power Production System (PPS) in which the fuel gas can be combusted with oxygen, and heat energy formed by the combustion can be converted to power. The methods utilizing the combined POX system and PPS can be defined by a number of characteristics in various embodiments. Exemplary embodiments are provided below.

All impurities derived from the carbonaceous or hydrocarbon fuel, the POX process, and the oxygen derived from the oxygen plant (e.g., an air separation unit) that are present in the POX fuel gas from the POX system following quench cooling, solid ash removal, and cooling by heat exchange with recycle high pressure $CO_2$ from the PPS are combusted in the PPS. Exemplary impurities can be impurities that are present in excess of $H_2$, CO, $CH_4$, $CO_2$, $H_2O$, $N_2$, and Ar.

All oxidizable impurities present in the POX fuel gas can be oxidized by combustion in the PPS.

Sulfur compounds, such as $H_2S$, COS, and $CS_2$, that are present in the POX fuel gas can be oxidized to $SO_2$, $SO_3$, $H_2O$, and $CO_2$. Any $NH_3$ and HCN present in the POX fuel gas can be oxidized to NO, $NO_2$, $H_2O$, and $CO_2$.

The POX process preferably operates at a pressure of about 2 MPa or greater.

The PPS can be defined by generation of power utilizing a turbine with an inlet pressure of about 10 MPA or greater.

The PPS can be defined by generation of power utilizing a turbine with a pressure ratio of about 12 or less (inlet to outlet).

The POX reaction can be carried out at an adiabatic flame temperature of about 1300° C. to about 1600° C.

The feed to the POX reactor can be slurried with powdered solid fuel in either water, $CO_2$, or a combination thereof The feed to the POX reactor can be defined as comprising an entrained stream of powdered solid fuel.

The feed to the POX reactor can be defined as comprising a liquid such as a heated stream of bitumen.

The POX reactor can be adapted to include an internal heat transfer section that transfers radiant heat to a portion of a high pressure recycle stream taken from the PPS at a temperature of about 250° C. or greater and returned to the PPS at a temperature below the exit temperature of the high pressure recycle stream leaving the PPS recuperator heat exchanger.

The direct products of the POX reaction can be quench-cooled by direct mixing with a recycled portion of cooled quenched POX fuel gas, with a portion of liquid water condensed from the cooled quenched POX fuel gas, with $CO_2$ recycled from the PPS, or with a combination of these three.

Ash arising from the fuel used in the POX process can be removed following quench cooling of the POX products and before further cooling of the POX fuel gas.

The temperature achieved in quench cooling of the POX stream can be at or below a temperature of about 400° C. or at a temperature at which the velocity of the BOUDOUARD reaction is sufficiently low such that no carbon deposition or metal dusting corrosion occurs in any downstream equipment in the POX system or the PPS.

POX products following quench cooling and ash removal can be cooled to a temperature of about 100° C. or less by using heating high pressure recycle fluid streams taken from and returned to the PPS.

The PPS can be defined by the mixing of combustion products in the PPS combustor with a pressurized recycle stream and the passage of the total stream through at least one PPS turbine adapted for power generation.

The PPS can be defined by the operation of the turbine or turbines at a final discharge pressure of about 0.1 MPa or greater or, in other embodiments, about 1 MPa or greater.

The PPS can be defined by the use of one or more recuperative heat exchangers that heat the previously compressed high pressure recycle stream against at least the total turbine exhaust stream or streams.

The PPS can be defined by the conversion of the $SO_2$ and $SO_3$ to $H_2SO_4$ by reaction with $O_2$, liquid $H_2O$, $NO_2$, and NO.

The PPS can be defined by the conversion of NO, $NO_2$, and liquid $H_2O$ to $HNO_3$.

The PPS acid conversions can be carried out at an operating temperature corresponding to the point at which water condenses, down to a temperature at which the water and acids are separated from the cooled turbine exhaust gas at the cold end of the recuperative heat exchanger.

Acids plus soluble inorganic components formed by reaction with the acids and optionally diluted with condensed water from the PPS combustor can be removed for further treatment.

A high pressure $CO_2$ recycle fluid stream or streams can be used for cooling the quenched POX product gas following ash removal.

The high pressure $CO_2$ recycle fluid stream can optionally comprise more than one fluid stream taken from the PPS at more than one temperature level.

More than one high pressure $CO_2$ recycle fluid stream can be returned to the PPS at more than one temperature level.

One fluid stream can be taken from the PPS and returned to the PPS as more than one stream at more than one temperature level.

More than one fluid stream can be taken from the PPS and returned to the PPS as a single heated stream.

The cooled net POX fuel gas product, following cooling and separation of POX quench recycle fluid, can be compressed from the pressure at which it exits the POX system to a pressure substantially the same as the inlet pressure of the PPS combustor.

A fluid stream taken from the PPS for use in cooling a quenched POX product gas can be part of the pressurized recycle stream from the PPS.

The oxygen used in the POX system can have a purity greater than 90% molar, preferably greater than 95% molar.

The partially oxidized gas can be quenched with water producing a gas mixture containing at least $H_2$, CO, $CO_2$, one or more sulfur compounds (e.g., $H_2S$), and $H_2O$.

Cooling of the quenched POX fuel gas can be carried out with two streams of pressurized recycle gas from the PPS; the inlet temperature of the first recycle stream entering the POX heat exchanger can be at the discharge temperature of the PPS recycle $CO_2$ compressor; and the inlet temperature of the second recycle $CO_2$ stream entering the POX heat exchanger can be within 20° C. of the water dew-point in the PPS turbine exhaust stream.

The POX stream comprising fuel gas can be quenched with water to produce a POX gas saturated with water vapor having excess liquid water present; and the two inlet streams of pressurized recycle gas from the PPS can leave the POX heat exchanger as a single stream at a temperature within 20° C. of the POX gas dew-point temperature.

The POX stream can be quenched with water to produce a quenched POX stream that is above its dew-point temperature and below 400° C.; the two inlet streams entering the POX heat exchanger can be heated and combined at the temperature point corresponding to the second inlet stream temperature; a first exit heated fluid stream can be removed at a temperature within 20° C. of the POX stream dew-point temperature, and the remaining stream can be further heated and leave the POX heat exchanger at a temperature of about 380° C. to 399° C.

A portion of the POX fuel gas following quench cooling can be removed and passed through a catalytic shift reactor to convert CO and $H_2O$ to $H_2$ and $CO_2$.

The exit gas from the shift reactor can be cooled in the quenched POX heat exchanger against recycle gas taken from and returned to the PPS.

The shifted gas can be mixed with a portion of the unshifted gas and further processed to separate water, $CO_2$, sulfur compounds, mercury, and other volatile inorganic components, leaving a mixture comprising $H_2$ and CO in a ratio from 0.8 to 1 to 2.5 to 1.

The shifted gas alone can be further processed to produce a pure $H_2$ stream of greater than 99% molar.

The content of sulfur compounds, $NH_3$, HCN, and water in the $H_2$ or $H_2$ and CO streams each can be less than 1 ppm molar.

The separation device can be defined as a multi-bed pressure swing adsorption (PSA) system.

The low pressure waste gas from the PSA comprising the adsorbed products from the PSA system can be compressed to the pressure required by the PPS combustor and mixed into the total POX fuel gas flow to the PPS combustor.

The oxygen used for the POX of the primary fuel can be heated in the POX heat exchanger to a temperature of up to 350° C.

The oxygen used in the PPS combustor can be heated in the POX heat exchanger to a temperature of up to 350° C.

In some embodiments the present disclosure can relate to a process for the production of power using a combination of a POX system and a PPS, and the process can comprise the following steps:

combining a solid or liquid fuel and oxygen in a POX reactor under conditions sufficient to partially oxidize the fuel and form a POX stream comprising a fuel gas;

quenching the POX stream through combination with a quenching fluid under conditions sufficient to form a quenched POX stream at a temperature of about 400° C. or less and to solidify at least a portion of any molten solids present in the POX stream;

treating the quenched POX stream so as to remove at least a portion of any solids present therein;

directing the quenched POX stream to a POX heat exchanger and withdrawing a quantity of heat from the quenched POX stream by cooling the quenched POX stream to a temperature of about 100° C. or less against a cooling stream and form a POX fuel gas stream;

passing the POX fuel gas stream through a separator vessel and separating at least a portion of any water present in the POX fuel gas stream;

compressing the POX fuel gas stream to a pressure of about 12 MPa or greater;

combusting the POX fuel gas in a PPS combustor to form a combustion product stream (optionally with a portion of excess oxygen) at a pressure of at least about 10 MPa and a temperature of at least about 800° C.; and expanding the combustion product stream across a PPS turbine to generate power and form an expanded PPS combustion product stream.

In specific embodiments, the process for the production of power can be further defined by a variety of characteristics that may be independently applied to a process as noted above. For example, the solid or liquid fuel can be a carbonaceous fuel. The fuel combined in the POX reactor can be an entrained stream of a powdered, solid fuel. The carbonaceous fuel specifically can be coal. The coal can be slurried with water or $CO_2$. The quenched POX stream can comprise ash, slag, or a combination thereof, and the step of removing solids can comprise passing the quenched POX stream through a water scrubber unit. The step of removing solids can comprise filtering the quenched POX stream so as to reduce dust load to about 4 mg or less per cubic meter of fuel gas in the quenched POX stream. The POX reactor can be operated at a POX temperature, and a ratio of the POX temperature to the temperature of the quenched POX stream can be about 2:1 or greater. The POX temperature can be about 1300° C. to about 1600° C. The POX reactor can be operated at a pressure of about 2 MPa or greater. Quenching can comprise mixing the POX stream with: a recycled portion of the cooled POX fuel gas stream exiting the heat exchanger; a portion of the water separated from the cooled POX fuel gas stream; $CO_2$ recycled from the PPS, water, or a combination thereof. The cooling stream in the heat exchanger can comprise a high pressure recycle fluid stream withdrawn from and returned to the PPS. The high pressure recycle fluid stream can be a recycle $CO_2$ fluid stream. The recycle $CO_2$ fluid stream can comprise $CO_2$ formed in the combusting of the POX fuel gas in the PPS combustor. The POX reactor can include an internal heat transfer component. The internal heat transfer component can be adapted to transfer radiant heat to a portion of a high pressure recycle stream taken from a component of the PPS at a temperature of about 250° C. or greater. The internal heat transfer component can be adapted to return the high pressure recycle stream to a component of the PPS. The PPS turbine can have an inlet pressure of about 10 MPa or greater. The PPS turbine can have an outlet pressure that is defined as a ratio of the turbine inlet to the turbine outlet. In an example embodiment, the ratio can be about 10 or less.

In further embodiments, the process for the production of power using a combination of a POX system and a PPS also can comprise:

passing the expanded PPS combustion product stream through a PPS recuperator heat exchanger and thereby withdrawing heat from the PPS combustion product stream and forming a cooled PPS combustion product stream;

optionally passing the cooled PPS combustion product stream through a water cooler;

treating the cooled PPS combustion product stream in a PPS scrubber separating at least one or $H_2SO_4$, $HNO_3$, or water-dissolved Hg salts and forming a recycle $CO_2$ stream; and pressurizing the recycle $CO_2$ stream in a PPS compressor and forming a compressed recycle $CO_2$ stream.

In specific embodiments, the separating step can comprise separating conversion products $H_2SO_4$ and $HNO_3$ formed by reaction of $SO_2$, $SO_3$, NO, $NO_2$, $H_2O$, and $O_2$ plus condensed water and dissolved Hg salts. Passing the expanded PPS combustion product stream through the PPS recuperator heat exchanger can cool the PPS combustion product stream to a temperature below the water dew point. The fuel gas in the POX fuel gas stream entering the PPS combustor can comprise at least one fuel gas component selected from $H_2$, CO, and $CH_4$. The POX fuel gas stream entering the PPS combustor can comprise one or more impurities separate from the fuel gas and derived from the solid or liquid fuel, the partial oxidation thereof, and the oxygen. The one or more impurities can comprise at least one of a sulfur compound, $NH_3$, and HCN. The one or more impurities expressly can exclude $N_2$ and argon. Substantially all of the impurities can still be present in the POX fuel gas stream and can be combusted in the PPS combustor. All oxidizable impurities present in the POX fuel gas stream can be oxidized by the combustion in the PPS combustor. The combustion product stream from the PPS combustor can comprise a mixture of combustion products and at least a portion of the compressed recycle $CO_2$ stream. The withdrawn heat from the PPS combustion product stream can heat at least a portion of the compressed recycle $CO_2$ stream. The POX stream can be quenched with water. The water quenched POX stream can comprise at least $H_2$, CO, $CO_2$, $H_2S$, and $H_2O$. The cooling stream in the POX heat exchanger can comprise two streams of the compressed recycle $CO_2$. An inlet temperature of the first compressed recycle $CO_2$ stream entering the POX heat exchanger can be substantially the same as a temperature of the compressed recycle $CO_2$ stream discharged from the PPS compressor. An inlet temperature of the second compressed recycle $CO_2$ stream entering the POX heat exchanger can be within 20° C. of the water dew-point in the expanded PPS combustion product stream. The water quenched POX stream can be saturated with water vapor so as to comprise excess liquid water. The two compressed recycle $CO_2$ streams can combine in the POX heat exchanger to form a single stream. The single compressed recycle $CO_2$ stream exiting the POX heat exchanger can be at a temperature that is within about 20° C. of the POX fuel gas dew-point temperature. The water quenched POX stream can have a temperature that is above its dew-point temperature and below about 400° C. The two compressed recycle $CO_2$ streams can be heated, and the point at which the two compressed recycle $CO_2$ streams combine to form the single stream can be at a temperature that substantially corresponds to the inlet temperature of the second compressed recycle $CO_2$ stream. The single stream can be split into the following: a first exiting heated and compressed recycle $CO_2$ stream that exits the POX heat exchanger at a temperature that is within about 20° C. of the POX stream dew-point temperature; and a second exiting heated and compressed recycle $CO_2$ stream that exits the POX heat exchanger at a temperature of about 380° C. to about 399° C.

In additional embodiments, a portion of the quenched POX stream can be directed through a POX catalytic shift reactor. The POX catalytic shift reactor can be adapted to convert a mixture of CO and $H_2O$ into a shift reactor exit gas comprising a mixture of $H_2$ and $CO_2$. The shift reactor exit gas can be cooled in the POX heat exchanger against a recycle gas taken from and returned to the PPS. The shift reactor exit gas can be mixed with a portion of the quenched POX stream and can be further processed to separate water, $CO_2$, sulfur compounds, Hg, and volatile inorganic compounds so as to form a mixture comprising $H_2$ and CO in a ratio of about 0.8:1 to about 2.5:1. The shift reactor exit gas can be further processed to form a pure $H_2$ stream with a purity of 99% or greater molar. The POX stream processor can be a multi-bed pressure swing adsorption (PSA) system. A low pressure waste gas from the PSA system comprising adsorbed products from the PSA system can be compressed to a PPS combustor pressure and mixed into a total fuel gas flow entering the PPS combustor. The oxygen used in the POX reactor can be heated in the POX heat exchanger to a temperature of up to about 350° C. The oxygen used in the PPS combustor can be heated in the POX heat exchanger to a temperature of about 350° C.

In other embodiments, the present disclosure can provide a combined POX system and PPS, and the combined system can be useful for producing power, such as electricity, from a starting fuel that is non-gaseous. In some embodiments, a POX system and PPS can comprise the following elements:

a POX reactor adapted to partially oxidize a liquid or solid fuel in the presence of oxygen to form a POX stream comprising a fuel gas;

one or more components adapted to contact the POX stream with a quenching fluid;

an optional POX scrubber adapted to separate any solids present in the quenched POX stream from the POX fuel gas;

a POX heat exchanger adapted to withdraw heat from the POX fuel gas against a portion of a compressed recycle $CO_2$ stream and output a cooled POX fuel gas;

an optional separator adapted to separate any liquid water from the POX fuel gas;

a compressor adapted to compress the cooled POX fuel gas to a pressure of about 12 MPa or greater;

a PPS combustor adapted to combust the POX fuel gas in the presence of oxygen and a portion of the compressed recycle $CO_2$ stream and form a PPS combustion product stream at a pressure of about 12 MPa or greater;

a turbine adapted to expand the PPS combustion product stream and generate power in a connected generator;

a recuperator heat exchanger adapted to withdraw heat from the expanded PPS combustion product stream and add the heat to the compressed recycle $CO_2$ stream;

a PPS scrubbing tower adapted to separate any oxidized impurities from the expanded PPS combustion product stream and output a recycle $CO_2$ stream;

a PPS compressor adapted to compress the recycle $CO_2$ stream to a pressure of about 12 MPa or greater and form the compressed recycle $CO_2$ stream;

flow components adapted to direct a portion of the compressed recycle $CO_2$ stream to the POX heat exchanger;

flow components adapted to direct a portion of the compressed recycle $CO_2$ stream to the PPS recuperator heat exchanger; and flow components adapted to direct the compressed recycle $CO_2$ stream from the POX heat exchanger to the PPS recuperator heat exchanger.

BRIEF DESCRIPTION OF THE DRAWINGS

Figure 1:
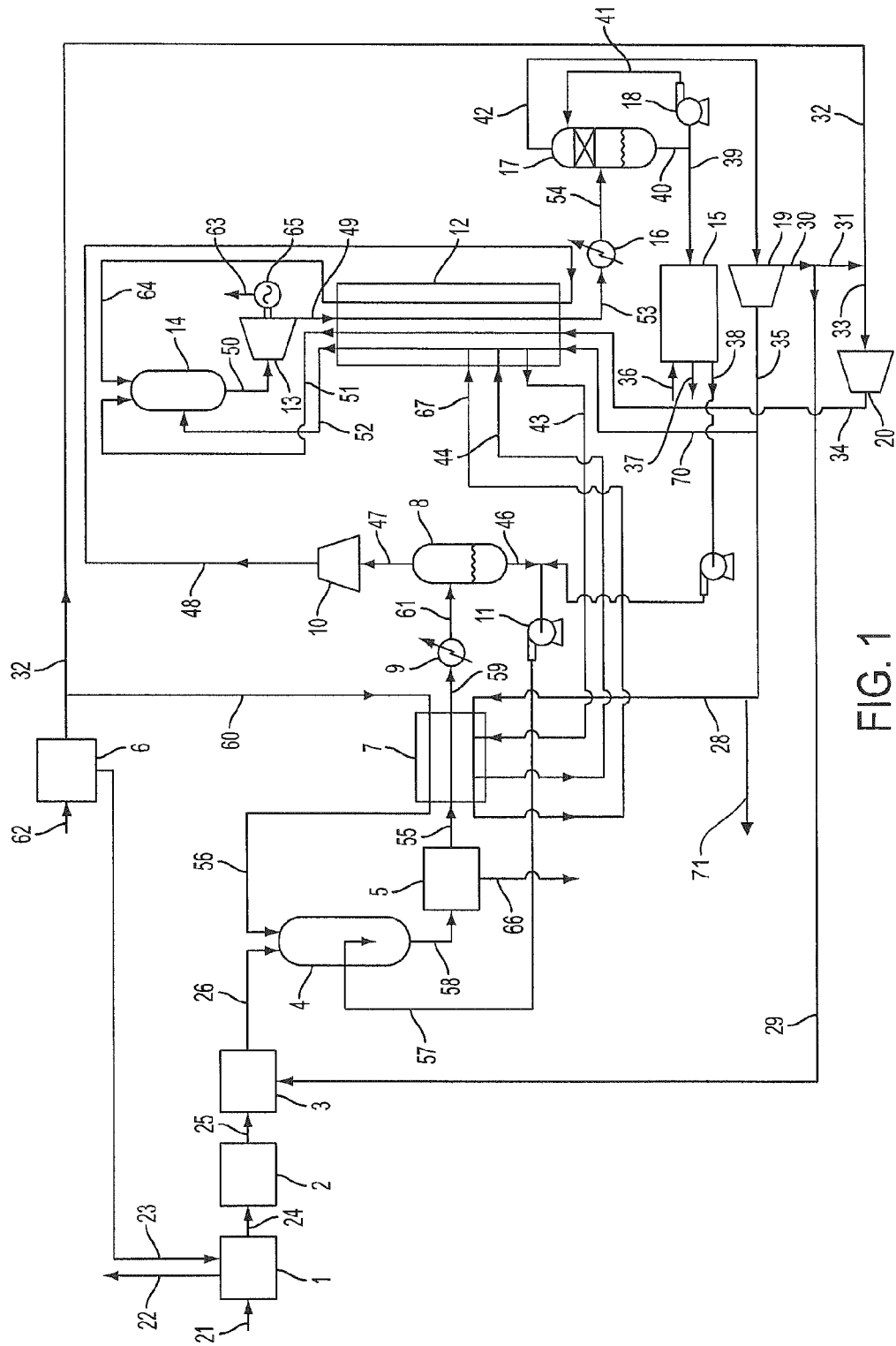
Figure 2:
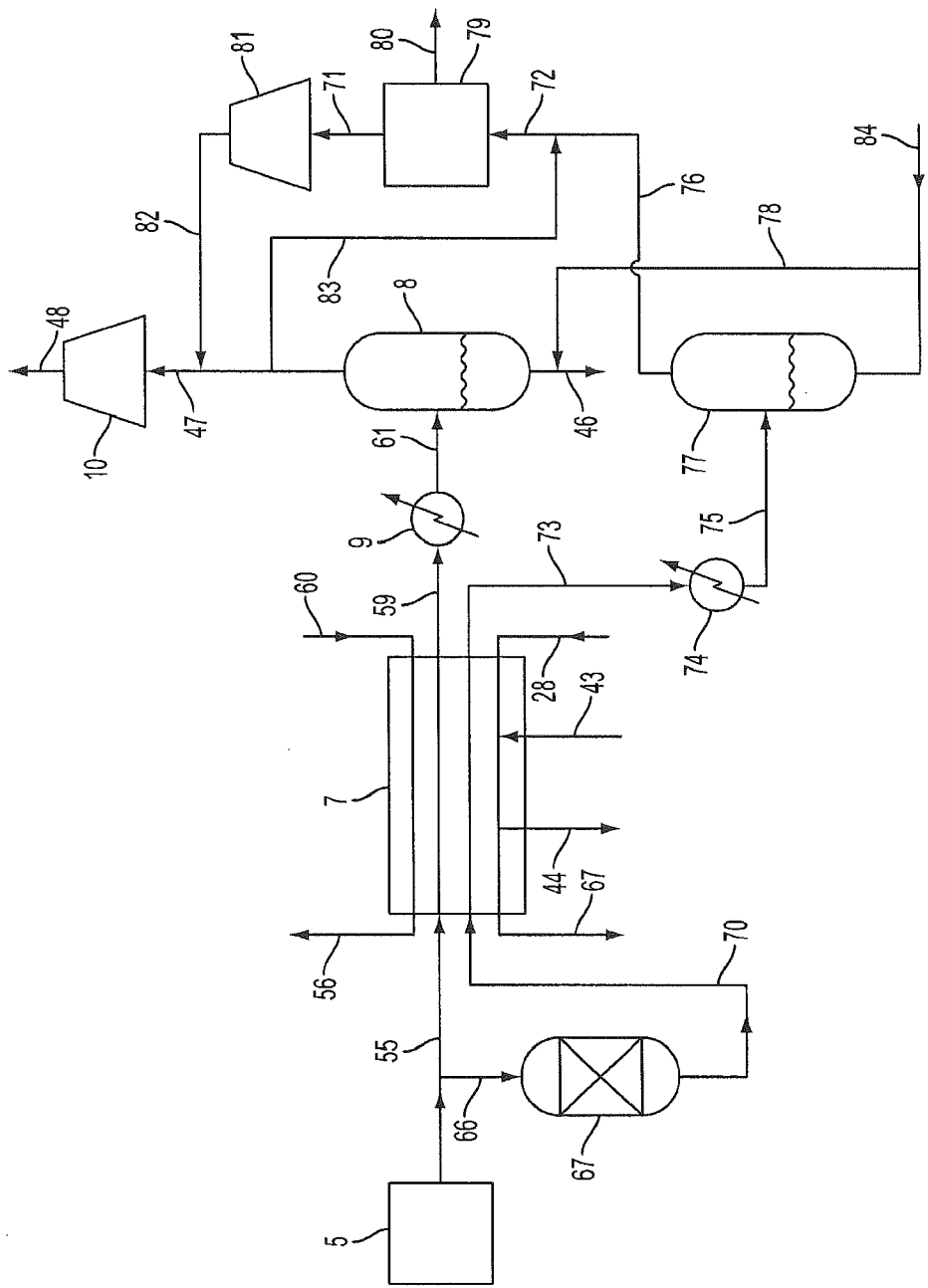
Figure 3:
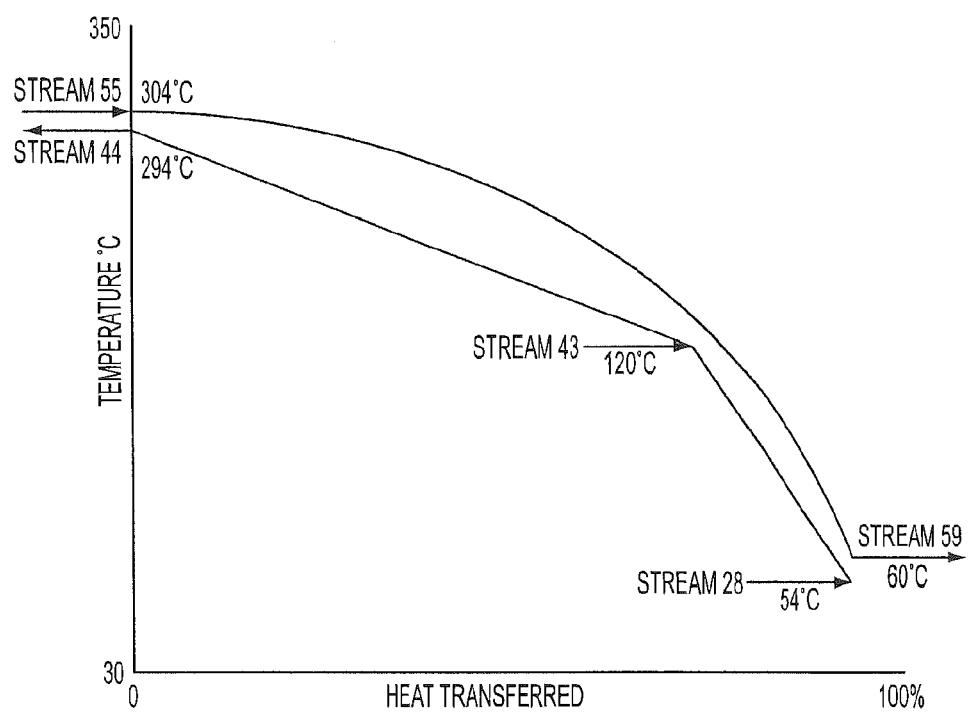
Figure 4:
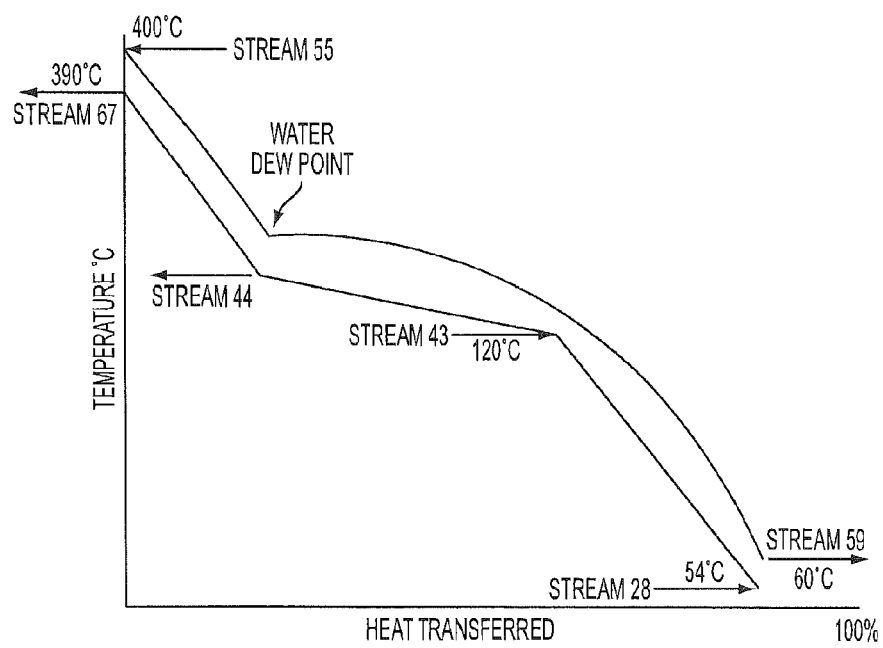

Having thus described the invention in general terms, reference will now be made to the accompanying drawings, which is not necessarily drawn to scale, and wherein:

FIG. 1 is flow sheet illustrating an example embodiment of a combined POX system and PPS according to the present disclosure wherein the PPS generates power using a fuel gas derived from the partial oxidation of a liquid or solid hydrocarbon or carbonaceous fuel in the POX system;

FIG. 2 is a flow sheet illustrating a portion of the combined system from FIG. 1, wherein the illustrated portion particularly shows elements of the combined system useful for production of export $H_2$ or $H_2+CO$ mixtures;

FIG. 3 is a plot of temperature versus heat transferred in a fuel gas heat exchanger for a system according to an example embodiment of the present disclosure using a $CO_2$ coal slurry with a water quenched POX reaction operating with excess water so that the quenched POX fuel gas is at the water dew-point temperature;

FIG. 4 is a plot of temperature versus heat transferred in a POX heat exchanger for a system according to an example embodiment of the present disclosure using a $CO_2$ coal slurry with a water quenched POX reaction operating at a quench temperature of 400° C.;

FIG. 5 shows the mass and heat balance from an ASPEN simulation of a power system combining a POX system and a PPS according to an example embodiment of the present disclosure, wherein the simulation included the use of a coal/$CO_2$ slurry in the POX reactor and utilization of water as a quenching fluid; and FIG. 6 shows the mass and heat balance from an ASPEN simulation of a power system combining a POX system and a PPS according to an example embodiment of the present disclosure, wherein the simulation included the use of a coal/$CO_2$ slurry in the POX reactor and utilization of $CO_2$ as a quenching fluid.

DETAILED DESCRIPTION OF THE DISCLOSURE

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The systems and methods of the present disclosure are adapted for achieving partial oxidation (POX) of a carbonaceous fuel, particularly a solid fuel and/or a liquid fuel. Non-limiting examples of fuels that can be used according to the present disclosure include coal, lignite, petroleum coke, bitumen, biomass, algae, wood, graded combustible solid waste refuse, asphalt, used tires, crude oil, other ash containing liquid fuels, and the like.

In various embodiments, the systems and methods of the disclosure are adapted to partially oxidize the fuel using oxygen, preferably substantially pure $O_2$, so as to produce a stream that is useful as a fuel gas. The partial oxidation can be carried out in a POX reactor. In particular embodiments, an air separation unit or other oxygen plant can be utilized in the systems and methods of the present disclosure. Oxygen from the plant can be directed to the POX reactor. In some embodiments, the oxygen can be first passed through a heat exchanger to increase the temperature of the oxygen entering the POX reactor. Nitrogen from the air separation plant also can be incorporated into the systems and methods. For example, dry $N_2$ can be passed through a crusher that is particularizing solid fuels and thus partially dry the particulate fuel. The particulate fuel can be further crushed in a second crusher to a particle size preferably of about 500 microns or less, about 250 microns or less, or about 100 microns or less. The small particle fuel can be directed to a mixer to be formed into a slurry with a slurrying medium. The slurry medium can comprise $CO_2$, which preferably has a pressure of about of 3.5 MPa or greater, about 5 MPa or greater, or about 8.5 MPa or greater. The $CO_2$ in the $CO_2$ slurry medium preferably can be at a temperature of about 5° C. to about 40° C., about 10° C. to about 30° C., or about 12° C. to about 25° C. The $CO_2$ in the $CO_2$ slurry medium can have a density of about 500 kg/m³ to about 1000 kg/m³, about 600 kg/m³ to about 900 kg/m³, or about 700 kg/m³ to about 800 kg/m³. The slurry medium can alternately comprise water or a combination of $CO_2$ and water. A solid fuel slurry used in the POX reactor can comprise about 25% to about 75%, about 30% to about 70%, or about 40% to about 60% by weight solid fuel. The particulate fuel slurry is then combined in the POX reactor with the oxygen, which preferably comprises about 90% molar or greater, about 95% molar or greater, of about 97% molar or greater oxygen. The POX reactor preferably operates at a pressure of about 4.5 to about 8.5 MPa and a temperature of about 1450° C.; however, the temperature and pressure can be in any combinations of temperature and pressure ranges as otherwise disclosed herein in relation to the nature of the POX stream exiting the POX reactor.

Partial oxidation of the carbonaceous fuel in the POX reactor forms a POX stream, which can be defined in terms of the components thereof. In particular, the POX stream can comprise a fuel gas and one or more impurities (oxidizable impurities and non-oxidizable). The fuel gas can comprise hydrogen, carbon monoxide, or a combination thereof. Exemplary impurities derived from the original POX fuel (solid or liquid hydrocarbons or carbonaceous material) or the partial oxidation reactions include, for example, $H_2S$, COS, $CS_2$, HCN, $NH_3$, and Hg. The stream arises from the POX reactor wherein the POX stream produced therefrom can be quenched with a cooling fluid. This can result in the partial vaporization of the cooling fluid to produce a fuel gas comprising vaporized cooling fluid mixed with fuel gas. Excess quench cooling fluid can be used giving a mixture of liquid cooling fluid and vapor fuel gas plus vaporized cooling fluid as a product from the POX reactor. The cooled POX stream can undergo separation so that solids (e.g., solid ash particles) can be removed. The solids particularly can be removed in a mixture with the liquid cooling fluid that is separated from the fuel gas mixture. Any remaining fine ash particles can be removed by a downstream cooling fluid wash column followed by a candle filter or the like. Alternatively, the quench can result in a gaseous phase with entrained ash particles that are removed in a combination of cyclones and filters. The cooled POX stream thereafter can be cooled in a heat exchanger to recover at least a portion of the useful heat that was present in the POX stream prior to quench cooling. In particular, the bulk of the vaporized cooling fluid mixed with the fuel gas can be condensed, and the heat can be transferred primarily to a high pressure recycle stream to reduce the temperature difference at the hot end of a recuperative heat exchanger in the power production system. This can be particularly beneficial to increase the overall efficiency of the power production system alone or in combination with the POX system. The POX stream (i.e., the fuel gas stream) can be produced at a pressure that is less than or equal to the pressure required for further combustion of the fuel gas in the combustor for power production. For example, a combustor and associated power production cycle that can be combined with the systems and methods of the present disclosure is described in U.S. Patent Application Publication No. 2011/0179799, the disclosure of which is incorporated herein by reference in its entirety. Such combustor and associated power production cycle may be referenced herein as the "NET Power System." The process of the NET Power System achieves power generation using predominantly $CO_2$ as a working fluid. In particular, the process uses a high pressure/low pressure ratio turbine that expands a mixture of a high pressure recycle $CO_2$ stream and combustion products arising from combustion of the fuel. Pure oxygen can be used as the oxidant in the combustion process. The hot turbine exhaust is used to partially preheat the high pressure recycle $CO_2$ stream. The recycle $CO_2$ stream of the NET Power System is also heated using heat derived from the compression energy of the air feed of the $O_2$ production plant. All fuel and combustion derived impurities such as sulfur compounds, NO, $NO_2$, $CO_2$, $H_2O$, Hg and the like are separated for disposal with no emissions to the atmosphere.

The systems and methods of the present disclosure specifically can be characterized as being a combination of a POX system and power production system (PPS). The NET Power system is an example of a PPS that can be used according to the present disclosure. In particular, a POX fuel gas stream can be introduced to the PPS combustor as part or all of the fuel stream for the combustor. In a high pressure combustion cycle, the fuel gas from the POX stream must in general be compressed to the high pressure required in the power production system combustor. For example, the POX fuel gas stream may be compressed in a compressor to a pressure of at about 10 MPa or greater, about 15 MPa or greater, about 20 MPa or greater, or about 25 MPa or greater. In other embodiments, the pressure can be about 8 MPa to about 50 MPa, about 15 MPa to about 45 MPa, or about 20 MPa to about 40 MPa.

The POX fuel gas stream arising from the reaction of the oxygen with a solid or liquid fuel can comprise varying amounts of solids and molten solids that must be removed before introduction of the POX fuel gas stream into the PPS combustor. Specifically, the POX fuel gas stream can be quenched and cooled as necessary to a temperature wherein ash and other solid materials can be removed. This is beneficial to prevent downstream contamination of equipment in the POX system and the PPS. The heat liberated during cooling of the POX fuel gas stream can be transferred to the power production system to maximize overall efficiency of the power production system. In particular, this heat can be used for partially heating at least a portion of the recycle $CO_2$ fluid circulating in the power production after cooling of the combustion product stream and prior to input of the recycle $CO_2$ fluid back into the combustor of the power production system. In particular, the heat can be added to the recycle $CO_2$ fluid following the compression of the recycle $CO_2$ fluid. Optionally the oxygen required for the POX reactor and/or the power production system combustor can also be heated against the cooling POX stream in the same or a different heat exchanger.

The POX reactor can be adapted to provide an output POX fuel gas stream having a temperature that is about 1200° C. or greater, about 1300° C. or greater, or about 1400° C. or greater. More particularly, the temperature can be about 1000° C. to about 2000° C., about 1200° C. to about 1800° C., or about 1300° C. to about 1600° C. In various embodiments, one or more steps can be utilized to cool the POX stream (and thus the fuel gas for input to a further combustor), preferably to about ambient temperature.

In one step, the POX stream immediately exiting the POX reactor at a temperature as described above can be quenched to a lesser temperature. Quenching reduces the temperature preferably to 400° C. or less which is a region where the velocity of the BOUDOUARD reaction is so low that no carbon formation or metal dusting corrosion will occur. Quenching to a temperature of 400° C. or less serves to condense volatile metal salts for subsequent removal. The quenching step can be adapted to reduce the temperature of the POX stream to a lesser temperature that can be defined by a ratio in relation to the POX reaction temperature. In particular embodiments, the ratio of the POX reaction temperature to the temperature of the quenched POX stream can be about 3.25:1 or greater, about 3, 5:1 or greater, or about 4:1 or greater. More particularly, the temperature ratio of the POX stream to the quenched POX stream can be about 3.25:1 to about 6:1, about 3.75:1 to about 5.5:1, or about 4:1 to about 5:1. In particular embodiments, the temperature of the quenched POX stream can be about 400° C. or less, about 350° C. or less, or about 300° C. or less. In particular embodiments, the temperature can be about 200° C. to about 400° C., about 225° C. to about 375° C., or about 250° C. to about 350° C. Quenching can be carried out by mixing of the POX stream with one or more quenching fluids. Non-limiting examples of quenching fluids that can be used according to the present disclosure include a stream of recycled POX product (i.e., at least a portion of the POX product that has been already cooled to a quenching fluid temperature then cooled in the POX gas heat exchanger followed by liquid water separation), water at a quenching fluid temperature, liquid $CO_2$, mixtures thereof, and the like. A useful quenching fluid temperature can be about 150° C. or less, about 100° C. or less, about 75° C. or less, or about 60° C. or less. The quenching fluid temperature particularly can be about 10° C. to about 150° C., about 15° C. to about 100° C., or about 20° C. to about 75° C. Alternately the quenching fluid can be preheated against the cooling quenched POX gas or by other means to a temperature approach of typically about 20° C. below the POX quench temperature. In embodiments using a water quench, a portion of the water can be vaporized thus giving a mixture of fuel gas, steam, and a liquid water portion, which washes out the bulk of the ash particles. The temperature of the total liquid and vapor will be determined by the pressure used in the POX reactor and the quantity of liquid water used for the quench.

A further step can provide for separation of any liquid water and the bulk of any ash particles or further solids from the quenched POX stream vapor. Removal of the solids can be carried out using any conventional separation or filter means. Non-limiting examples of suitable solids removal components include cyclone filters, settling tanks, candle filters, bag filters, liquid wash towers, and the like. In some embodiments, a separator can be provided in the lower part of the POX reactor. The separated vapor in general can be introduced into the base of a counter current water wash column to remove further traces of particulate ash. The cleaned POX fuel gas plus steam stream can then optionally be passed through a gas filter, such as a candle filter, to ensure that there can be no deposition of particles in the heat exchanger used for cooling the fuel gas or in the downstream PPS. In some embodiments, a liquid $CO_2$ stream can be used as the quench fluid. In this case the total stream after quench may consist of a single vapor phase with entrained solid particles. The quantity of liquid $CO_2$ used for quench can be such that the temperature of the quenched stream is about 200° C. to about 400° C. The ash can be removed in a series of filters as noted above. In other embodiments, a cooled separated fuel gas stream following water separation can be used as part or all of the quench fluid. In various embodiments, a preferred method of quench may use water. The system may also use a mixture of water and $CO_2$ in which the quantity of water is sufficient to produce enough liquid water following quench to wash out the bulk of the ash particles.

In yet another step, the quenched POX stream (preferably after filtering of solids) can be cooled to near ambient temperature. Accordingly, the disclosed systems and methods can include one or more components adapted for heat exchange. In particular, a heat exchanger can be adapted to transfer the heat from the quenched POX stream to one or more portions of the high pressure $CO_2$ recycle stream utilized in the power production system. For example, the heat can be transferred to the high pressure $CO_2$ recycle stream taken from the $CO_2$ recycle compressor discharge and/or to one or more appropriate points in the recuperator heat exchanger that is used in the power production cycle. The choice of temperatures for the injection of heat to the PPS recuperator heat exchanger and the number and inlet temperature of the streams taken from the PPS recuperator heat exchanger to be heated in the quenched fuel gas cooler can be determined by altering the heat recovery process to ensure heat recovery is at the maximum temperature level consistent with economic heat exchanger sizes.

The solid fuel used in the POX reactor can be provided in a variety of forms. In embodiments noted above, a solid fuel can be provided in a particulate form, preferably a finely powdered state and can be slurried with a slurry medium. In preferred embodiments, the slurry medium can comprise, for example, water, liquid $CO_2$, and combinations thereof. Liquid $CO_2$ can be formed, at least in part, from recycled $CO_2$ from the power production system. The use of $CO_2$ as the slurrying fluid can be particularly useful to reduce the heat required to raise the temperature of the POX fuel feed to the POX reactor range as compared to the use of a different slurry medium such as water (e.g., water condensed and separated from the power production system). Although $CO_2$ can be a preferred slurrying medium, other materials, including water, may still be used as desired and may lead to acceptable losses in efficiency under certain embodiments of the present disclosure. The carbonaceous fuel used in the POX reactor can be a liquid such as heated bitumen, in which case no slurrying fluid may be needed.

When using $CO_2$ or water as the slurrying medium, the composition of the POX stream leaving the POX reactor can have a high carbon monoxide (CO) concentration and partial pressure. In such embodiments, it can be particularly desirable to ensure that quenching of the POX stream is adapted to cool the stream and thus form a quenched POX stream having a temperature of less than 400° C. Providing such temperature drop can particularly limit BOUDOUARD reaction kinetics to a sufficiently low state such that no carbon can be deposited in the POX stream heat exchanger and such that no metal dusting corrosion can take place in downstream equipment.

In relation to particular embodiments, the systems and methods of the disclosure can encompass at least the following four sets of operating conditions in relation to the combination of the POX fuel feed and the POX heat exchange: $CO_2$ fuel slurry with $CO_2$ quench; $CO_2$ fuel slurry with water quench; water fuel slurry with water quench; and water fuel slurry with $CO_2$ quench. It is understood, however, that other combinations may arise based upon utilization of further slurrying media and/or further quenching fluids. Moreover, the fuel slurry medium can be a combination of water and $CO_2$. Likewise, the quenching fluid can be a combination of water and the cooled POX stream.

Heat liberated by cooling the quenched POX stream in the heat exchanger following ash removal can be transferred to one or more portions of the high pressure $CO_2$ recycle stream taken from the power production system. The quench fluid can be recycled POX fuel gas leaving the cool end of the POX heat exchanger following liquid water separation, or it can be condensed and separated water. It also can be a combination of fuel gas and water. Still further, it can be recycled $CO_2$, or a combination of fuel gas, or water, or both with $CO_2$. In some embodiments, the source of the quench fluid can be particularly relevant. Embodiments utilizing a $CO_2$ slurrying medium can result in a net production of water derived from hydrogen and water present in the solid fuel feed (e.g., coal). Separated liquid water thus can be treated to separate flammable components dissolved in the water. These separated flammables can be compressed and returned to the power production system combustor. The cleaned water stream then can be recycled to either the solid fuel slurrying system or the POX quench system, and any surplus water can be sent to the power production system where it can be used to dilute any $H_2SO_4/HNO_3$ acid produced at the water separation stage in the power production system as described in U.S. Patent Application Publication No. 2011/0179799. In embodiments wherein the solid fuel is slurried with water, the water present in the high temperature POX stream can react with the CO produced by partial oxidation of the carbon in the solid fuel to produce hydrogen gas and carbon monoxide. These can be present in a ratio of approximately 1:1 $H_2$ and CO by volume.

This consumption of water in the shift reaction can be indicative of a water deficiency, and water produced in the power production system then can be returned to the POX system to produce the solid fuel coal slurry and thus make up for this consumption. The net, cooled POX stream (i.e., the fuel gas stream) then can be compressed to the required pressure for combustion in the power production combustor. In various embodiments, the system and method of the present disclosure can be adapted for production of an internal quench fluid for use with the high temperature POX stream exiting the POX reactor. This can arise from the sequential steps of POX reaction, solids removal, heat exchange cooling, and water separation. The net quantity of fuel gas from the POX stream can be compressed and delivered to the power production system combustor with a relatively high concentration of flammable gases (e.g., $H_2$ and CO) and with a calorific value which will ensure useful combustion conditions in the power production system combustor.

In some embodiments, a POX reactor according to the disclosure can be adapted to operate at a pressure that is higher than the pressure in the power production system combustor. The power production system combustor particularly can use $CO_2$ as the working fluid that is continuously recycled in the system. Preferably, the POX stream can be quenched and cooled via heat exchange as described herein using either cooled POX stream or water as the quench medium, and the cooled POX stream (i.e., a fuel gas) can be used in the power production system without the need for further compression. The POX reactor can comprise any reactor adapted for combustion of a carbonaceous fuel, particularly wherein the fuel is only partially oxidized, and particularly wherein the reactor is adapted to function at a pressure that is greater than the operating pressure of a power production system combustor as described herein. In exemplary, non-limiting embodiments, a POX combustor can utilize transpiration cooling wherein a cooling fluid, such as $CO_2$, is passed through a porous transpiration layer surrounding the POX combustion chamber, which can be particularly useful to prevent ash impingement and agglomeration. Exemplary embodiments of transpiration cooling that can be used with a POX reactor according to the present disclosure are described in U.S. Patent Application Publication No. 2010/0300063 to Palmer et al., U.S. Patent Application Publication No. 2011/0083435 to Palmer et al. and U.S. Patent Application Publication No. 2012/0073261 to Palmer et al., the disclosures of which are incorporated herein by reference in their entireties.

In further embodiments, a POX reactor according to the disclosure can be adapted to operate at a pressure that is below the pressure of the power production system combustor. In such embodiments, a POX stream for use as a fuel in the power production system combustor can be compressed before passage into the power production system combustor. The POX reactor can comprise any commercially available system. Non-limiting examples of commercially available systems useful according to the present disclosure include a Shell dry powdered coal feed entrained flow reactor, a GE/Texaco quench reactor, a Siemens cooling screen quench reactor, or similar systems. Useful POX reactors can include internal heat transfer sections absorbing radiant heat from the POX burner. In such embodiments, a portion of the high pressure recycled $CO_2$ stream from the power production system can be heated and returned at a higher temperature to the PPS system. For example, recycled $CO_2$ at a temperature of about 400° C. or higher can be heated to a temperature of about 450° C. to about 600° C. within the POX reactor and returned to the recuperative heat exchanger in the power production system where it can be remixed with a further portion of the high pressure recycle $CO_2$ stream at a similar temperature.

Combination of a POX reactor with a power production system according to the present disclosure can provide a variety of useful aspects. As an example, the combination can be defined in that impurities (such as from coal or other solid fuel and from partial oxidation of the fuel) can be retained in the cooled, high pressure POX stream that enters the power production system combustor. Such impurities can comprise $H_2S$, COS, $CS_2$, HCN, $NH_3$, Hg. These and other impurities can be oxidized in the power production system combustor so as to form, for example, $SO_2$, $CO_2$, $N_2$, NO, and Hg, which then can be removed from the power production system. For instance, a water stream condensed from the power production system combustor exit stream can be acidic comprising one or more of $HNO_3$, $H_2SO_4$, and dissolved inorganic salts, such as described in U.S. Patent Application Publication No. 2011/0179799.

The processing of the solid fuel through the POX reactor rather than directly through a power production system combustor can be particularly useful in light of the ability to remove possibly fouling reaction products. For example, a POX stream exiting the POX reactor can be quenched to a temperature of about 400° C. or less or a further temperature useful to ensure that ash derived from coal (or other molten impurities arising from coal or other solid fuel) is in a solid form which can be removed. Preferably, solid impurities can be removed down to a very low concentration and sufficiently low particle size so as to substantially prevent blockage and/or corrosion of components of the power production system, such as heat exchangers, turbines, compressors, and the like.

In addition to the foregoing, the quenching of the POX stream from the POX reactor can be adapted to provide a quenched POX stream below a temperature as defined herein and is sufficiently low to ensure that the vapor phase concentration of any inorganic components in the solid fuel is likewise sufficiently low to substantially prevent deposition in one or more components of the power production system. For example, partial oxidation of coal can produce one or more alkali metal salts including NaCl, $CaSO_4$, and KCl, which can be removed as discussed herein. The upper temperature limit of the quenched POX stream also can be adapted to ensure that the BOUDOUARD reaction is sufficiently slow so as to substantially prevent carbon deposition and/or metal dusting corrosion in any heat exchanger or other components in the power production system.

The systems and methods of the present disclosure can be adapted to provide for recovery of substantially all of the heat released during cooling of the POX stream, preferably cooling to near ambient temperature, and recovery of the heat into the recycled high pressure $CO_2$ stream in the power production system. This additional heating particularly can be provided at the lower temperature level in the recuperator heat exchanger of the power production system. Input of additional heat in this manner can provide a significant positive effect on the overall efficiency of the power production system. This effect is due to the much higher specific heat of the high pressure recycle $CO_2$ stream in the lower temperature range of 50° C. to 400° C. compared to the higher temperature range of 400° C. to 800° C. and to the lower specific heat of the turbine exhaust stream that is cooling in the recuperator heat exchanger of the power production system. This marked difference means that significant additional extra heat is required in the recuperator heat exchanger over the temperature range 50° C. to 400° C. to heat the recycle $CO_2$ stream. The additional heat obtained from the quenched POX stream in the POX stream heat exchanger provides an effective quantity of additional heat for the power production system combustor that is substantially equivalent to the quantity of heat released when fuel gas itself is combusted.

In various embodiments wherein the POX reactor is quenched to saturation using a recycle water stream, the temperature-heat release curve for the quenched POX stream cooling to near ambient temperature shows a large initial heat release as the water vapor derived from vaporization of the quench water begins to condense. This heat release per unit temperature drop reduces progressively as the POX stream cools. The effect requires two separate high pressure recycle $CO_2$ streams taken from the power production system high pressure recycle stream to be used to recover heat from the cooling quenched POX stream. In some embodiments, the first high pressure recycle $CO_2$ stream can be taken from the $CO_2$ recycle compressor discharge at the temperature of about 45° C. to about 70° C. The second high pressure recycle $CO_2$ stream can be taken from the high pressure recycle stream at a point in the recuperator heat exchanger where there is a small temperature approach to the dew-point of the turbine exhaust cooling stream. These two streams together can provide for a large initial heat release from the cooling quenched POX stream as its water content begins to condense that can be efficiently transferred back to the high pressure $CO_2$ recycle stream at the highest possible temperature level (see FIG. 3). In embodiments wherein the POX stream is initially quenched to about 400° C., a cooling range between about 400° C. and the water dew point of the quenched POX stream exists, and this range can require a lower flow of recycle high pressure $CO_2$ to efficiently remove this portion of the heat available from the quenched POX stream as compared to the temperature range below the water dew point of the POX stream. This can be accomplished by removing a portion of the heating high pressure recycle $CO_2$ stream at a point near and/or below the water dew-point temperature of the quenched POX stream while the remaining portion is removed at a temperature near to and/or below the quench temperature (e.g., about 400° C.) (see FIG. 4). The heated high pressure recycle $CO_2$ streams then can be returned to the recuperator heat exchanger at a corresponding temperature point to the bulk flow of high pressure recycle $CO_2$ in the recuperator heat exchanger. In various embodiments, options for the two streams to combine in the POX cooling heat exchanger with a single return stream can be provided. In some embodiments, more than two streams of high pressure recycle fluid can be used.

In some embodiments, the fuel gas taken from the POX reactor following quench and ash removal can comprise predominantly $H_2$, CO, $CO_2$ and $H_2O$ at a temperature of about 250° C. to about 400° C. A portion of this fuel gas stream can be taken for the production of pure $H_2$, CO, or a combination thereof with varying $H_2$ to CO ratios. Typical applications for large scale $H_2$ production can be, for example, hydro-desulfurization and hydrocracking in refineries and, potentially, as a vehicle fuel. Typical applications for $H_2$ and CO mixtures can be, for example, Fischer-Tropsch hydrocarbon liquids production (e.g., with about a 2.2 $H_2$ to CO ratio) and methanol production (e.g., with about a 2.0 $H_2$ to CO ratio). In each case, the $H_2$ to CO ratio must be increased from the ratio of approximately 1 or less in the POX fuel gas stream where the ratio depends on use of $CO_2$ or water as the slurrying medium for the solid fuel. Water based slurry with more water in the POX product gas results in a significant proportion of the CO being converted to $H_2$ and $CO_2$, giving a $H_2$ to CO ratio of just below 1. $CO_2$ based slurry has a much lower $H_2$ to CO ratio. It can be useful to pass at least part of the separated quenched POX fuel gas stream through a catalytic shift reactor to convert CO to $H_2$ by reaction with steam, as shown below in Formula (2).

$$CO+H_2O \rightleftharpoons H_2+CO_2 \qquad (2)$$

This can be accomplished using a portion of the fuel gas taken at a temperature of about 250° C. to about 400° C. following ash removal and by using a sulfur tolerant CO shift catalyst, such as one based on cobalt in the shift reactor. The portion of fuel gas that has been enriched in $H_2$ can be then cooled in a separate pass through the POX heat exchanger. Heat released in the exothermic shift reaction can be transferred into the PPS as previously described. The exit shifted gas then can be mixed with a portion of the remaining cooled POX stream and the combined stream can be passed through a multi-bed pressure swing adsorber designed to separate the $H_2$ and CO at the required $H_2$ to CO ratio as a single non adsorbed component while the adsorbed components can contain all of the sulfur compounds, HCN, $NH_3$, Hg, $CO_2$, $H_2O$ and most of the $CH_4$. This un-adsorbed fraction may also contain some $N_2$ and Ar derived from the coal (or other solid or liquid fuel) and oxygen used in the POX reactor. These inert components preferably will be below 5% total concentration which is acceptable for the gas feed to both the Fischer-Tropsch and Methanol reactors. If pure $H_2$ production is required, only the shifted cooled gas will be fed to the PSA. The near atmospheric pressure waste gas from the PSA with all of the coal and POX derived impurities in a reduced form will be compressed and returned to the remaining POX fuel gas for combustion in the PPS combustor.

One embodiment of a power production system with partial oxidation of a solid fuel is described in reference to FIG. 1, wherein a solid fuel is provided in the form of coal feed stream 21 to be partially oxidized in the POX reactor 4. The coal stream 21 is crushed and partially dried in large particle crusher 1 that is also fed dry nitrogen stream 23 comprising $N_2$ at a temperature of about 82° C. (180° F.) taken from an air separation unit 6, which produces oxygen streams 32 and 60 and nitrogen stream 23 from air intake stream 62. Preferably, the dry nitrogen stream 23 can be heated against a higher temperature stream of $CO_2$ rich turbine exhaust leaving the recuperator heat exchanger in the PPS. The coal is further crushed to a particle size preferably of about 250 microns or less in the small particle crusher 2 to provide particularized coal stream 25, which is directed to a slurry mixer 3. In the slurry mixer 3, the particularized coal is mixed with $CO_2$ slurry medium stream 29, which preferably has a pressure of about 8.5 MPa or greater. The $CO_2$ in the $CO_2$ slurry medium stream 29 in this embodiment is at a temperature of about 17° C. The $CO_2$ in the $CO_2$ slurry medium stream 29 has a density of about 865 kg/m$^3$. The powdered coal is increased in pressure in a lock hopper system or by other means to a pressure of 8.5 MPa prior to mixing with the $CO_2$. A coal/$CO_2$ slurry stream 26 exits the slurry mixer 3 and preferably comprises about 45% by weight coal. Alternatively the slurry medium can be a water stream. The powdered coal injection system can also be configured as a dry feed system in which the powdered pressurized coal is entrained in a nitrogen stream and fed into the POX burner. The slurry stream 26 is then pumped into the POX reactor 4 where it is combined with oxygen stream 56, which preferably comprises 97% molar or greater oxygen concentration. The POX reactor 4 preferably operates at a pressure of about 8.5 MPa and a temperature of about 1400° C.; however, the temperature and pressure can be in any combinations of temperature and pressure ranges as otherwise disclosed herein in relation to the nature of the POX stream exiting the POX reactor. The conditions for the preparation of the coal slurry can be adjusted accordingly.

The POX reactor 4 is adapted to partially oxidize the coal and form a POX stream, which may exit the POX reactor and enter a quench chamber (not illustrated) or may be quenched within the POX reactor itself, as illustrated in FIG. 1. The POX stream can comprise a fuel gas that can comprise one or more combustible (i.e., oxidizable) materials, including but not limited to $H_2$, CO, $CH_4$, $H_2S$, COS, $CS_2$, HCN, $NH_3$. Moreover, the POX stream can comprise Hg and other impurities derived from the coal (or other solid fuel) as well as inert materials (e.g., $N_2$ and Ar), such as derived from the oxygen stream 56, plus other trace components. The POX stream also can comprise one or more non-combustible materials, such as ash or slag, which can be filtered from the POX stream as desired.

The POX stream (either internal to the POX reactor or in a separate component) is quenched by mixing with a quench fluid (liquid water stream 57 in the present embodiment). As illustrated, the liquid water stream 57 enters the POX reactor near the base in a restriction nozzle. The addition of the quench stream cools the POX stream components preferably to below the water saturation temperature of about 304° C. (although higher temperatures also are encompassed). The quench temperature preferably also can be a temperature at which non-combustibles, such as ash and slag, are in solid form. The excess quench water collects with the slag and the bulk of the fine ash in the sump of the POX reactor vessel (or separate quench vessel) where it is removed for further treatment. The quenched POX stream 58 passes to scrubber unit 5, which comprises a water scrub tower followed by a fine cartridge filter adapted to reduce the dust load to about 4 mg/m$^3$ or less of fuel gas, about 3 mg/m$^3$ or less of fuel gas, or about 2 mg/m$^3$ or less of fuel gas. Scrubber unit 5 also can include all equipment and pumps required to recycle the scrub water and also to treat the ash stream 66 for disposal. An exemplary embodiment of a system useful for POX reactor ash treatment and gas cleaning is a GE/Texaco POX system with a coal/water slurry burner, which alternatively can be modified to accept a coal/CO₂ slurry.

The cleaned fuel gas plus steam stream 55 is cooled in heat exchanger 7. The exit stream 59 is further cooled against cooling water in heat exchanger 9. Liquid water 46 is separated in separation vessel 8 from the inlet stream 61 and pumped in pump 11 back to the POX reactor quench and some addition makeup water from stream 38 to produce quench water stream 57. The net fuel gas stream 47 is compressed in a multi-stage centrifugal compressor 10 to a pressure suitable for input as stream 48 to the power production system combustor 14. As an example, the fuel gas stream 47 can be compressed to a pressure of about 30.5 MPa. The compressed fuel gas stream 48 is heated in the recuperator heat exchanger 12 to a temperature suitable for input to the power production system combustor 14. As an example, the compressed fuel gas stream 48 can be heated to a temperature of about 746° C. The heated fuel gas stream 64 is burned in the power production system combustor 14 where it is combined with oxygen and $CO_2$. In the illustrated embodiment, combined $O_2/CO_2$ stream 51 comprises 30% $O_2$ and 70% $CO_2$ on a molar basis. The combined $O_2/CO_2$ stream 51 preferably been heated to a temperature suitable for input to the power production system combustor 14. As an example, the combined $O_2/CO_2$ stream 51 can be heated to a temperature of about 746° C. in the recuperator heat exchanger 12. A hot recycle $CO_2$ stream 52 is directed from the recuperator heat exchanger 12 and is at a temperature suitable for input to the power production system combustor 14. As an example, the hot recycle $CO_2$ stream 52 can be heated to a temperature of about 746° C.

In the power production system combustor, the combustion gases from burning of the fuel gas are cooled with the hot recycle $CO_2$ stream 52 producing a combined combustion product stream 50 at a temperature of about 1150° C. and a pressure of about 30 MPa in the illustrated embodiment. This is expanded to a pressure of about 3 MPa in turbine 13 coupled to an electric generator 65 producing an output power 63. The turbine outlet stream 49 is cooled in the recuperator heat exchanger 12 leaving as cooled product stream 53 at a temperature of about 64° C. in the illustrated embodiment. The stream 53 is cooled to a temperature of about 17° C. in water cooler 16. The further cooled turbine outlet stream 54 enters a scrub tower 17, which has an outlet stream 40 that is largely recycled via circulation pump 18 to scrub tower liquid inlet 41 above the packed section of the tower that receives the further cooled turbine outlet stream 54. A portion of stream 40 is split out as stream 39 for further treatment. As the turbine exhaust gas cools below the water dew-point in the recuperator heat exchanger 12 the following reactions occur.

$$NO + \tfrac{1}{2}O_2 = NO \quad (3)$$

$$NO_2 + SO_2 = SO_3 + NO \quad (4)$$

$$SO_3 + H_2O = H_2SO_4 \quad (5)$$

The above reactions will proceed in the presence of liquid water, nitrogen oxides, $SO_2/SO_3$, and excess oxygen. The $SO_2/SO_3$ concentrations are reduced to very low levels since the limiting reaction shown in Formula (3) rapidly proceeds at 3 MPa, and the reactions of Formula (4) and Formula (5) are very fast. When all of the sulfur oxides have been converted to sulfuric acid, the nitrogen oxides are converted at about 95% conversion rate per pass to nitric acid with the following reaction sequence.

$$2NO_2 + H_2O = HNO_2 + HNO_3 \quad (6)$$

$$3HNO_2 = HNO_3 + 2NO + H_2O \quad (7)$$

$$NO + \tfrac{1}{2}O_2 = NO_2 \quad (8)$$

Returning to FIG. 1, the nitric acid present in net liquid acid product stream 39 will convert any mercury present to mercuric-chloride. The scrub tower 17 preferably is fitted with an additional water wash and acid mist removal section. Its primary function is to act as an efficient dilute acid removal device since virtually all the above reactions will have taken place upstream of the scrub tower 17. The mixed acids are treated with limestone slurry stream 36 (or other suitable base) in mixer 15 to produce gypsum and calcium nitrate stream 37. Any other trace metallic salts can also be separated. The residual water stream 38 following calcium nitrate and dissolved salts removal can be used as make-up to a cooling tower or the POX quench system or as scrub water recycled to scrub tower 17.

The predominantly $CO_2$ stream 42 leaving the scrub tower 17 at a pressure of about 2.9 MPa is compressed in a multi-stage intercooled compressor 19 followed by a dense fluid multistage pump to a pressure suitable for input to the power production system combustor, such as about 30.5 MPa. The compressed $CO_2$ discharge stream 35 leaves the last stage of the pump 19 at a temperature of about 54° C., and part of this flow, stream 70, is heated in the recuperator heat exchanger 12 to a temperature of about 746° C., leaving as $CO_2$ stream 52.

The air separation plant 6 in this embodiment produces a 99.5% molar oxygen purity product stream at a pressure of about 8.6 MPa which divides into two separate streams. Oxygen stream 60 is heated in heat exchanger 7 to a temperature of about 294° C., exiting as stream 56 for use in the POX reactor 4 for partial oxidation of the coal. The remaining oxygen stream 32 is mixed with $CO_2$ at a pressure of about 8.6 MPa. Specifically, $CO_2$ is taken from an intermediate stage of the compressor 19 as stream 30, and a portion stream 31 mixes with oxygen stream 32 giving a composition of about 30% $O_2$ and 70% $CO_2$ molar. This diluted $O_2$ stream 33 is compressed to a pressure of about 30.5 MPa in a multi-stage intercooled compressor 20 and the discharge stream 34 is heated in the recuperator heat exchanger 12 to a temperature of about 746° C. and enters the power production system combustor 14 as stream 51. Dilution of the pure $O_2$ stream 32 is beneficial to allow the oxygen required for combustion in the power production system combustor 14 to be heated to a high temperature without the need for oxidation resistant materials. This ensures the safe operation of the power production system. The 30% $O_2$ stream is useful to moderate the adiabatic combustion temperature in power production system 14 to a value of approximately 2400° C. The remaining portion of $CO_2$ stream 30 is $CO_2$ stream 29, which provides the $CO_2$ for slurrying the powdered coal and is directed to slurry mixer 3.

Cooling of the quenched POX gas in heat exchanger 7 is useful to transfer the maximum quantity of heat to the power production system to maximize the overall efficiency. The power production system requires a significant quantity of heat from an external source in the temperature range from near ambient up to about 400° C. This can be provided by using adiabatic air compressors in the air separation plant 6 and transferring the heat of compression to part of the high pressure recycle $CO_2$ stream. In the present embodiment, the required external heating load is provided by cooling the quenched POX gas in heat exchanger 7 and heating two high pressure recycle streams. High pressure recycle CO$_2$ stream 28 at a temperature of about 54° C. and high pressure recycle CO$_2$ stream 43 at a temperature of about 120° C. taken from an intermediate temperature point in recuperator heat exchanger 12 are heated to provide a combined heating outlet stream 44 at a temperature of about 294° C., which is returned to mix with the main recycle CO$_2$ stream at a corresponding temperature point in recuperator heat exchanger 12. Optionally, outlet stream 67 also may be returned to the recuperator heat exchanger at a corresponding temperature point to mix with the main recycle CO$_2$ stream as well.

Illustrated in FIG. 3 is a plot of temperature against percentage heat release (diagrammatically) in the recuperator heat exchanger 7 of FIG. 1 to show the benefit of two separate inlet streams of high pressure recycle CO$_2$ to ensure efficient operation of the combined system. The 120° C. temperature level of stream 43 inlet corresponds to a temperature approach to the water dew-point of the turbine exhaust stream in recuperator heat exchanger 12. The quenched POX fuel gas enters the heat exchanger at the water saturation temperature of 304° C., and the total heated high pressure recycle stream leaves at a temperature of 294° C.

Shown in FIG. 4 is an alternative method of operation in which the quench water stream reduces the POX gas temperature to about 400° C. There is an additional section of heat exchanger in which the quenched POX fuel gas temperature falls to its dew-point of about 300° C. To maximize the efficiency of the total power production system by minimizing the temperature difference in heat exchanger 7, the high pressure heated CO$_2$ stream is removed from the heat exchanger as two separate streams. Stream 44 is at a temperature of about 290° C. and stream 67 is at a temperature of about 390° C. These streams are separately returned to recuperator heat exchanger 12 where they reunite with the main high pressure recycle CO$_2$ stream at the appropriate corresponding temperatures.

In exemplary embodiments, heat exchanger 7 can be a high pressure brazed or diffusion bonded multi-channel unit. The material of construction preferably is corrosion resistant in the presence of the impurities present in the POX gas plus liquid water. Recuperator heat exchanger 12 preferably is a diffusion bonded multi-channel unit. This unit preferably is adapted for operation at temperatures up to about 800° C. and to be resistant to acid corrosion at temperatures below about 200° C. An exemplary suitable material is Specialty Metals alloy 740. In some embodiments, the average temperature at the hot end of heat exchanger 12 can be reduced to below 750° C. and, in such cases, alloy 617 can be suitable. Optionally the intermediate section between 200° C. and 540° C. can be fabricated from stainless steel. The section which is subject to potential acid corrosion below 200° C. can be constructed to allow replacement at intervals.

In further embodiments, alternate arrangements of the elements for processing the POX stream can be used. In an exemplary embodiment, FIG. 2 shows an optional arrangement wherein the POX product is used both for production of fuel gas for the power production system and for production of a separated and purified mixture of H$_2$ and CO. A sidestream 66 is taken from the quenched POX gas stream 55 following ash removal and passed through a catalytic shift converter 67 having a sulfur resistant cobalt based shift catalyst (or other suitable material). The higher temperature exit gas stream 70 is cooled in heat exchanger 7 to a temperature of about 60° C., exits as stream 73, and is further cooled by cooling water in heat exchanger 74 to a temperature of about 20° C. as stream 75. Condensed water is separated in separator 77, and the cooled gas stream 76 enters a multi-bed pressure swing adsorption unit 79. The water separated in separator 77 is added to liquid water stream 46. The pressure swing adsorption unit (PSA) 79 is designed to separate the inlet gas stream 76 into a pure H$_2$ or a pure H$_2$ and CO stream 80 leaving the unit at a pressure of about 8 MPa and a waste gas stream 71 which contains all of the impurities (e.g., H$_2$S, COS, CS$_2$, HCN, NH$_3$, Hg, and other trace components) as well as some combination of H$_2$, CO, CO$_2$, CH$_4$, and H$_2$O. The separation of the impurities is such that the concentration of these components in the H$_2$ or H$_2$ and CO product stream 80 is below 1 ppm. This arrangement uses a stream 83 of cooled POX gas containing a high concentration of CO to blend with the shifted cooled gas stream 76 to produce a stream 72 which when passed through the PSA unit 79 and gives the required flow and the required H$_2$ to CO ratio in the 8 MPa product stream 80. If pure H$_2$ is required then stream 83 is zero. The waste gas stream 71 from the PSA 79 at 0.12 MPa pressure is compressed in a multi-stage intercooled compressor 81 to a pressure of about 8 MPa, and the discharge stream 82 is added to the power production system fuel gas stream 47. The total fuel gas stream is compressed to a pressure of about 30.5 MPa in compressor 10, and the resultant high pressure fuel gas stream 48 is sent to the power production system combustor 14 via recuperator heat exchanger 12 (referencing FIG. 1). This arrangement ensures the transfer of all coal and POX derived impurities to the power production system where they are oxidized in the power production system combustor 14. In various embodiments, the consumption of additional water in the shift reaction can proceed according to Formula (9) and may require a small additional make-up flow.

$$H_2O+CO=CO_2+H_2 \qquad (9)$$

In various embodiments incorporating elements of the systems and methods described herein, the overall efficiency of the disclosed systems and methods is greater than 50% (on a lower heating value (LHV) basis with representative turbine and compressor efficiencies and heat exchanger temperature differences and pressure drops). Moreover, CCS is simultaneously provided along with substantially complete removal of all other fuel, POX, and combustion derived impurities. Excess CO$_2$ derived from the carbon in the fuel stream 21 is removed from the circulating CO$_2$ system as stream 71 at 30.5 MPa. This can be facilitated in that the systems and methods can be adapted to provide substantially all of the fuel derived CO$_2$ at a pressure of about 15 MPa or greater, about 20 MPa or greater, about 25 MPa or greater, or about 30 MPa or greater. This high efficiency beneficially can be achieved with a low cost system, such as using commercially available POX reactor systems and a high pressure CO$_2$ working fluid power cycle, such as described in U.S. Patent Application Publication No. 2011/0179799, which is incorporated herein by reference in its entirety. As a comparative example, existing commercial coal based integrated gasification combined cycle (IGCC) power generation systems with CO$_2$ capture and compression to pipeline pressure have been shown to have efficiencies on a comparable basis of only 34% to 39% and have much higher capital cost.

EXPERIMENTAL

The above described advantages of the presently disclosed methods and systems were verified via extensive ASPEN simulations under a variety of conditions with realistic estimates for commercial equipment performance. Two sets of simulations were carried out using Illinois #6 coal as the solid fuel introduced to the POX combustor. In each case, data is based upon the use of $CO_2$ as the coal slurry medium. The simulations differed in that the first simulation (see FIG. 5) was based upon the use water as the quenching fluid, and the second simulation (see FIG. 6) was based upon the use of $CO_2$ as the quench fluid.

Details of the mass and heat balance from the first simulation are provided in the Table shown in FIG. 5. Under the shown conditions, a fuel gas was produced typically with a $H_2$ to CO ratio of 0.41 to 1. The calculated efficiency for this embodiment on a lower heating value (LHV) basis was 51.44%.

Details of the mass and heat balance from the second simulation are provided in the Table shown in FIG. 6. Under the shown conditions, a fuel gas was produced typically with a $H_2$ to CO ratio of 0.17 to 1. In each case, hydrogen ratios can be increased with embodiments using water shift. The calculated efficiency for this embodiment on a LHV basis was 51.43%.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

LEGEND

1 Large particle crusher
2 Small particle crusher
3 Slurry mixer
4 POX reactor
5 Scrubber unit
6 Air separation unit
7 Cleaned fuel gas heat exchanger
8 Separation vessel
9 Cooling water heat exchanger
10 Centrifugal compressor
11 Pump
12 Recuperator heat exchanger
13 Turbine
14 PPS combustor
15 Mixer
16 Water cooler
17 Scrub tower
18 Circulation pump
19 Intercooled compressor
20 Intercooled compressor
21 Coal fuel stream
23 Nitrogen stream
25 Particularized coal stream
26 Coal/$CO_2$ slurry stream
28 High pressure recycle $CO_2$ stream
29 $CO_2$ slurry medium stream
30 $CO_2$ stream
31 $CO_2$ portion stream
32 Pure $O_2$ stream
33 Diluted $O_2$ stream
34 Discharge stream
35 Compressed $CO_2$ discharge stream
36 Limestone slurry stream
37 Gypsum and calcium nitrate stream
38 Residual water stream
39 Split stream from scrub tower outlet stream
40 Scrub tower outlet stream
41 Scrub tower liquid inlet
42 Predominately $CO_2$ stream
43 High pressure recycle $CO_2$ stream
44 Combined heating outlet stream
46 Liquid water stream
47 PPS fuel gas stream
48 Compressed fuel gas stream
49 Turbine outlet stream
50 Combined combustion product stream
51 Combined $O_2/CO_2$ stream
52 Hot recycle $CO_2$ stream
53 Cooled product stream
54 Further cooled turbine outlet stream
55 Quenched POX gas stream after ash removal
56 Heated oxygen stream
57 Liquid water stream
58 Quenched POX stream
59 Heat exchanger exit stream
60 Oxygen stream
61 Separation vessel inlet stream
62 Air intake stream
63 Output power
64 Heated fuel gas stream
65 Electric generator
66 Ash stream
67 High pressure recycle $CO_2$ outlet stream from cleaned fuel gas heat exchanger
70 Part of high temperature exit gas stream
71 Waste gas stream
72 Stream with cooled POX gas and shifted cooled gas
73 Heat exchanger exit stream
74 Cooling water heat exchanger
75 Further cooled heat exchanger exit stream
76 Cooled gas stream from separator
77 Separator
79 Swing adsorption unit
80 $H_2$ or $H_2$/CO stream from swing adsorption unit
81 Intercooled compressor
82 Compressor discharge stream
83 Cooled POX gas stream

The invention claimed is:

1. A process for the production of power using a combination of a partial oxidation (POX) system and a power production system (PPS), the process comprising:

combining a solid or liquid fuel and oxygen in a POX reactor under conditions sufficient to partially oxidize the fuel and form a POX stream comprising a fuel gas;

quenching the POX stream through combination with a quenching fluid under conditions sufficient to form a quenched POX stream at a temperature of about 400° C. or less and to solidify at least a portion of any molten solids present in the POX stream;

treating the quenched POX stream so as to remove at least a portion of any solids present therein;

directing the quenched POX stream to a POX heat exchanger and withdrawing a quantity of heat from the quenched POX stream by cooling the quenched POX stream to a temperature of about 100° C. or less against a cooling stream and form a POX fuel gas stream;

passing the POX fuel gas stream through a separator vessel and separating at least a portion of any water present in the POX fuel gas stream;

compressing the POX fuel gas stream to a pressure of about 12 MPa or greater;

combusting the POX fuel gas in a PPS combustor to form a combustion product stream at a pressure of at least about 10 MPa and a temperature of at least about 800° C.;

expanding the combustion product stream across a PPS turbine to generate power and form an expanded PPS combustion product stream;

passing the expanded PPS combustion product through a PPS recuperator heat exchanger and thereby withdrawing heat from the PPS combustion product stream and forming a cooled PPS combustion product stream;

optionally passing the cooled PPS combustion product stream through a water cooler;

treating the cooled PPS combustion product stream in a PPS scrubber separating at least $H_2SO_4$, $HNO_3$, or Hg and forming a recycle $CO_2$ stream; and pressurizing the recycle $CO_2$ stream in a PPS compressor and forming a compressed recycle $CO_2$ stream.

2. The process of claim 1, wherein the solid or liquid fuel is a carbonaceous fuel.

3. The process of claim 2, wherein the fuel combined in the POX reactor is an entrained stream of a powdered, solid fuel.

4. The process of claim 2, wherein the carbonaceous fuel is coal.

5. The process of claim 4, wherein the coal is slurried with water or $CO_2$.

6. The process of claim 4, wherein the quenched POX stream comprises ash, slag, or a combination thereof, and wherein the step of removing solids comprises passing the quenched POX stream through a water scrubber unit.

7. The process of claim 4, wherein the step of removing solids comprises filtering the quenched POX stream so as to reduce dust load to about 4 mg or less per cubic meter of fuel gas in the quenched POX stream.

8. The process of claim 1, wherein the POX reactor is operated at a POX temperature, and wherein a ratio of the POX temperature to the temperature of the quenched POX stream is about 3.25 or greater.

9. The process of claim 8, wherein the POX temperature is about 1300° C. to about 1600° C.

10. The process of claim 1, wherein the POX reactor is operated at a pressure of about 2 MPa or greater.

11. The process of claim 1, wherein quenching comprises mixing the POX stream with: a recycled portion of the cooled POX fuel gas stream; a portion of the water separated from the cooled POX fuel gas stream; a portion of a $CO_2$ recycle stream from the PPS; or a combination thereof.

12. The process of claim 1, wherein the cooling stream in the heat exchanger comprises a high pressure recycle fluid stream withdrawn from and returned to the PPS.

13. The process of claim 12, wherein the high pressure recycle fluid stream is a recycle $CO_2$ fluid stream.

14. The process of claim 13, wherein the recycle $CO_2$ fluid stream comprises $CO_2$ formed in the combusting of the POX fuel gas in the PPS combustor.

15. The process of claim 1, wherein the POX reactor includes an internal heat transfer component.

16. The process of claim 15, wherein the internal heat transfer component is adapted to transfer radiant heat to a portion of a high pressure recycle stream taken from a component of the PPS at a temperature of about 250° C. or greater.

17. The process of claim 16, wherein the internal heat transfer component is adapted to return the high pressure recycle stream to a component of the PPS.

18. The process of claim 1, wherein the turbine has an inlet pressure of about 10 MPa or greater.

19. The process of claim 18, wherein the turbine has an outlet pressure that is defined as a ratio of the turbine inlet to the turbine outlet, said ratio being about 12 or less.

20. The process of claim 1, wherein the oxygen used in the POX reactor has a purity of about 90% molar or greater.

21. The process of claim 20, wherein the oxygen used in the POX reactor has a purity of about 95% molar or greater.

22. The process of claim 1, wherein passing the expanded PPS combustion product stream through the PPS recuperator heat exchanger cools the PPS combustion product stream to a temperature below the water dew point.

23. The process of claim 1, wherein the fuel gas in the POX fuel gas stream entering the PPS combustor comprises at least one fuel gas component selected from $H_2$, CO, and $CH_4$.

24. The process of claim 23, wherein the POX fuel gas stream entering the PPS combustor comprises one or more impurities separate from the fuel gas and derived from the solid or liquid fuel, the partial oxidation thereof, and the oxygen.

25. The process of claim 24, wherein substantially all of the impurities are still present in the POX fuel gas stream and are combusted in the PPS combustor.

26. The process of claim 23, wherein the one or more impurities comprise at least one of a sulfur compound, $NH_3$, and HCN.

27. The process of claim 26, wherein all oxidizable impurities present in the POX fuel gas stream are oxidized by the combustion in the PPS combustor.

28. The process of claim 1, wherein the combustion product stream from the PPS combustor comprises a mixture of combustion products and at least a portion of the compressed recycle $CO_2$ stream.

29. The process of claim 1, wherein the withdrawn heat from the PPS combustion product stream heats at least a portion of the compressed recycle $CO_2$ stream.

30. The process of claim 1, wherein the POX stream is quenched with water.

31. The process of claim 30, wherein the water quenched POX stream comprises at least $H_2$, CO, $CO_2$, $H_2S$, and $H_2O$.

32. The process of claim 31, wherein the cooling stream in the POX heat exchanger comprises two streams of the compressed recycle $CO_2$.

33. The process of claim 32, wherein an inlet temperature of the first compressed recycle $CO_2$ stream entering the POX heat exchanger is substantially the same as a temperature of the compressed recycle $CO_2$ stream discharged from the PPS compressor.

34. The process of claim 32, wherein an inlet temperature of the second compressed recycle $CO_2$ stream entering the POX heat exchanger is within 20° C. of the water dew-point in the expanded PPS combustion process stream.

35. The process of claim 34, wherein the water quenched POX stream is saturated with water vapor so as to comprise excess liquid water.

36. The process of claim 35, wherein the two compressed recycle $CO_2$ streams combine in the POX heat exchanger to form a single stream.

37. The process of claim 36, wherein the single compressed recycle $CO_2$ stream exiting the POX heat exchanger is at a temperature that is within about 20° C. of the POX fuel gas dew-point temperature.

38. The process of claim 36, wherein the water quenched POX stream has a temperature that is above its dew-point temperature and below about 400° C.

39. The process of claim 38, wherein the two compressed recycle $CO_2$ streams are heated, and wherein the point at which the two compressed recycle $CO_2$ streams combine to form the single stream is at a temperature that substantially corresponds to the inlet temperature of the second compressed recycle $CO_2$ stream.

40. The process of claim 39, wherein the single stream is split into:
   a first exiting heated and compressed recycle $CO_2$ stream that exits the POX heat exchanger at a temperature that is within about 20° C. of the POX stream dew-point temperature;
   and a second exiting heated and compressed recycle $CO_2$ stream that exits the POX heat exchanger at a temperature of about 380° C. to about 399° C.

41. The process of claim 1 wherein the POX stream is quenched with $CO_2$ and optionally a portion of the fuel gas.

42. The process of claim 41 wherein the $CO_2$ quenched POX stream comprises at least $H_2$, CO, $CO_2$, $H_2S$, and $H_2O$.

43. The process of claim 42, wherein the cooling stream in the POX heat exchanger comprises one stream of the compressed recycle $CO_2$.

44. The process of claim 43 wherein an inlet temperature of the compressed recycle $CO_2$ stream entering the POX heat exchanger is substantially the same as a temperature of the compressed recycle $CO_2$ stream discharged from the PPS compressor and the single compressed recycle $CO_2$ stream exiting the POX heat exchanger is at a temperature that is within about 20° C. of the POX fuel gas dew-point temperature.

45. The process of claim 1, wherein at least a portion of the water quenched POX fuel gas enters a catalytic shift reactor adapted to convert a mixture of CO and $H_2O$ into a shift reactor exit gas comprising a mixture of $H_2$ and $CO_2$.

46. The process of claim 45, wherein the shift reactor exit gas is cooled in the POX heat exchanger against a high pressure recycle $CO_2$ gas taken from and returned to the PPS.

47. The process of claim 46, wherein the shift reactor exit gas is cooled in the POX heat exchanger and mixed with a portion of the quenched POX stream which has been cooled in the heat exchanger and is further processed to separate water, $CO_2$, sulfur compounds, nitrogen compounds, and Hg, so as to form a mixture comprising $H_2$ and CO in a ratio of about 0.8:1 to about 2.5:1.

48. The process of claim 47, wherein the cooled shift reactor exit gas is further processed to form a pure $H_2$ stream with a purity of 99% or greater molar.

49. The process of claim 47, wherein the POX catalytic shift reactor is a multi-bed pressure swing adsorption (PSA) system.

50. The process of claim 49, wherein a low pressure waste gas from the PSA system comprising adsorbed products from the PSA system is compressed to a PPS combustor pressure and mixed into a total fuel gas flow entering the PPS combustor.

51. The process of claim 1, wherein the oxygen used in the POX reactor is heated in the POX heat exchanger to a temperature of up to about 350° C.

52. The process of claim 1, wherein the oxygen used in the PPS combustor is heated in the POX heat exchanger to a temperature of about 350° C.

53. A combined partial oxidation (POX) system and power production system (PPS) comprising:
   a POX reactor adapted to partially oxidize a liquid or solid fuel in the presence of oxygen to form a POX stream comprising a fuel gas;
   one or more components adapted to contact the POX stream with a quenching fluid;
   an optional POX scrubber adapted to separate any solids present in the quenched POX stream from the POX fuel gas;
   an optional filtration device adapted to separate solidified ash particle from a single phase quenched POX fuel gas stream
   a POX heat exchanger adapted to withdraw heat from the POX fuel gas against a portion of a compressed recycle $CO_2$ stream and output a cooled POX fuel gas;
   an optional separator adapted to separate any liquid water from the POX fuel gas;
   a compressor adapted to compress the cooled POX fuel gas to a pressure of about 10 MPa or greater;
   a PPS combustor adapted to combust the POX fuel gas in the presence of oxygen and a portion of the compressed recycle $CO_2$ stream and form a PPS combustion product stream at a pressure of about 10 MPa or greater;
   a turbine adapted to expand the PPS combustion product stream and generate power in a connected generator;
   a recuperator heat exchanger adapted to withdraw heat from the expanded PPS combustion product stream and add the heat to the compressed recycle $CO_2$ stream;
   a PPS scrubbing tower adapted to separate one or more of $H_2SO_4$, $HNO_3$, and water-dissolved Hg salts from the expanded PPS combustion product stream and output a recycle $CO_2$ stream;
   a PPS compressor adapted to compress the recycle $CO_2$ stream to a pressure of about 10 MPa or greater and form the compressed recycle $CO_2$ stream;
   flow components adapted to direct a portion of the compressed recycle $CO_2$ stream to the POX heat exchanger;
   flow components adapted to direct a portion of the compressed recycle $CO_2$ stream to the PPS recuperator heat exchanger; and
   flow components adapted to direct the compressed recycle $CO_2$ stream from the POX heat exchanger to the PPS recuperator heat exchanger.

* * * * *